(12) United States Patent
Matsushima

(10) Patent No.: US 9,316,556 B2
(45) Date of Patent: Apr. 19, 2016

(54) KNOCK CONTROL APPARATUS FOR AN INTERNAL COMBUSTION ENGINE

(71) Applicant: MITSUBISHI ELECTRIC CORPORATION, Chiyoda-ku, Tokyo (JP)

(72) Inventor: Yuhei Matsushima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 403 days.

(21) Appl. No.: 13/736,349

(22) Filed: Jan. 8, 2013

(65) Prior Publication Data
US 2014/0041439 A1    Feb. 13, 2014

(30) Foreign Application Priority Data

Aug. 7, 2012    (JP) .................. 2012-174895

(51) Int. Cl.
*G01L 23/22*    (2006.01)
*F02D 35/02*    (2006.01)
*F02D 41/28*    (2006.01)

(52) U.S. Cl.
CPC ............ G01L 23/221 (2013.01); F02D 35/027 (2013.01); G01L 23/226 (2013.01); *F02D 2041/288* (2013.01); *F02D 2200/101* (2013.01)

(58) Field of Classification Search
CPC ... G01L 23/221; G01L 23/226; F02D 35/027; F02D 2200/101; F02D 2041/288
USPC .......................................... 73/35.09; 701/111
See application file for complete search history.

(56) References Cited

U.S. PATENT DOCUMENTS 4,583,175 A * 4/1986 Abe ...................... F02P 5/1525
123/406.38

7,043,353 B2 * 5/2006 Takemura ............. G01L 23/225
701/111

(Continued)

FOREIGN PATENT DOCUMENTS

JP          6-241107 A      8/1994
JP       2006-220115 A      8/2006

(Continued)

OTHER PUBLICATIONS

Preliminary Notice of Reasons for Rejection, dated Apr. 9, 2013, Patent Application No. 20012-174895.

*Primary Examiner* — Laura Martin
*Assistant Examiner* — Suman K Nath
(74) *Attorney, Agent, or Firm* — Sughrue Mion, PLLC; Richard C. Turner

(57) ABSTRACT

A knock control apparatus for an internal combustion engine can remove regularly generated noise vibration in a simple and appropriate manner. The apparatus includes a knock sensor, a crank angle sensor, a vibration waveform detection unit that detects a vibration waveform of a knock natural frequency component, a vibration waveform average value calculation unit that calculates a vibration waveform average value corresponding to a noise vibration waveform by filtering the vibration waveform over a plurality of ignition cycles, a noise vibration waveform removal unit that removes the noise vibration waveform by subtracting the vibration waveform average value from the vibration waveform, a knock determination threshold value calculation unit that calculates a threshold value based on a peak value of the vibration waveform after removal of the noise vibration waveform, and a knock determination unit that determines whether a knock has occurred, by comparing the peak value with the threshold value.

7 Claims, 11 Drawing Sheets

(56) References Cited

U.S. PATENT DOCUMENTS

| | | | | |
|---|---|---|---|---|
| 2008/0091335 A1* | 4/2008 | Takemura | G01L 23/225 | 701/111 |
| 2008/0103675 A1* | 5/2008 | Ishizuka | F02D 41/123 | 701/103 |
| 2009/0012673 A1* | 1/2009 | Hori | F02D 35/023 | 701/29.1 |
| 2010/0174472 A1* | 7/2010 | Matsushima | F02P 5/152 | 701/111 |
| 2012/0296558 A1* | 11/2012 | Ono | F02P 5/152 | 701/111 |

FOREIGN PATENT DOCUMENTS

| JP | 200792610 A | 4/2007 |
|---|---|---|
| JP | 4473171 B2 | 6/2010 |

* cited by examiner

KNOCK CONTROL APPARATUS FOR AN INTERNAL COMBUSTION ENGINE

BACKGROUND OF THE INVENTION

1. Field of the Invention

The present invention relates to a knock control apparatus for suppressing a knock occurring in an internal combustion engine.

2. Description of the Related Art

In general, it is known that when a knock occurs during operation of an internal combustion engine, vibrations of a natural frequency band will occur according to the bore size of each cylinder of the internal combustion engine or the mode of vibration of the knock, wherein a knock phenomenon generated in the internal combustion engine is detected by the use of a vibration sensor (hereinafter referred to as a "knock sensor") which is directly mounted on the engine block of the internal combustion engine.

In the above-mentioned knock detection apparatus, a knock is detected by carrying out arithmetic operation such as discrete Fourier transform (DFT: Discrete Fourier Transform), etc., with respect to an output of the knock sensor, and measuring the vibration strength of the natural frequency band of the internal combustion engine.

In addition, as a characteristic of the internal combustion engine, it is also known that when ignition timing is advanced, the output torque of the internal combustion engine can be improved, but a knock tends to be easily generated, and on the contrary, when ignition timing is retarded, the output torque of the internal combustion engine decreases but a knock becomes difficult to occur.

Accordingly, in the past, there has been adopted a knock control apparatus in which in cases where a knock is detected, ignition timing is corrected to a retard side thereby to suppress a knock, and after non-detection of a knock is confirmed, the ignition timing is returned to an advance side, thereby making it possible to suppress torque reduction to a minimum extent.

In this case, by correcting the ignition timing to the retard side upon detection of a knock, and making the ignition timing return to the advance side at the time of non-detection of a knock, it becomes possible to control the operation of the internal combustion engine at knock limit ignition timing by which a maximum torque is outputted, while suppressing the occurrence of knock.

In the above-mentioned knock control apparatus, a knock determination threshold value for determining an occurrence of a knock is obtained as follows. That is, peak values of the vibration strength are detected in a knock detection zone which has been set in advance as a crank angle range in which vibrations resulting from a knock generally appear to a remarkable extent, and further, the knock determination threshold value is calculated based on fundamental statistics (an average value, a standard deviation, etc.) of the peak values calculated by carrying out filtering processing of the peak values over a plurality of ignition cycles.

However, depending upon the operating state of the internal combustion engine, a vibration not resulting from a knock (hereinafter referred to as "noise vibration") may be superposed in the knock detection zone with a larger strength than that of a vibration resulting from an actual knock. In this case, there has been a problem that there occurs a defect such as mis-detection of a knock, omission of detection, or the like.

In other words, it becomes difficult to detect an actual knock vibration, due to the superposition of noise vibration.

Accordingly, in the past, there has been proposed a technique in which the above-mentioned defect is eliminated to improve knock detectability, by removing a noise vibration waveform from vibration waveforms detected by a knock sensor (for example, refer to a first patent document to be described later).

In a conventional apparatus described in the first patent document, first of all, a knock vibration waveform generated resulting from a knock and a noise vibration waveform generated resulting from the operation of component parts of the internal combustion engine have been stored in advance.

Subsequently, the position of the occurrence of noise vibration is specified by making a comparison between vibration waveforms which have been detected by the knock sensor within a predetermined crank angle range around the center of the position of the occurrence of noise vibration predicted based on the control state of the component parts, and the noise vibration waveform stored in advance.

Then, the noise vibration waveform is removed by subtracting the noise vibration waveform stored in advance from the vibration waveform at the position of the occurrence of noise vibration thus specified, among the vibration waveforms detected by the knock sensor.

Finally, an actual state of occurrence of a knock is determined by making a comparison between the vibration waveform from which the noise vibration waveform has been removed and the knock vibration waveform stored in advance.

According to this, in cases where noise vibration is superposed, it is determined with a high degree of accuracy whether a knock has occurred or not.

However, in order to remove noise vibration in an accurate manner, the position of vibration of noise and the adaptation of the waveform thereof are required, but the noise vibration waveform generated resulting from the operation of the component parts may also change depending upon the states of the individual component parts. In addition, it may also change depending upon installation distances between the knock sensor and the individual component parts, or the operating state of the internal combustion engine.

In this manner, it is difficult to adapt and store, in advance through experiments, etc., noise vibration waveforms which change in a variety of ways according to individual situations. In addition, even if such adaptation can be made, a lot of adaptation man hours are required, and besides, actually generated noise vibration waveforms can not be removed in a suitable manner, resulting in a possibility that knock detectability may get worse.

In addition, in cases where a noise vibration waveform and a vibration waveform which is generated resulting from a knock are superposed with each other at the same timing, it becomes difficult to specify the noise vibration waveform, and besides, it also becomes difficult to specify the knock vibration waveform.

Further, as noise vibrations generated resulting from other than a knock, there can be considered not only a noise vibration generated resulting from the operation of the component parts, but also a noise vibration resulting from the combustion of the internal combustion engine as well as a noise vibration inherent in the internal combustion engine, etc., but the waveforms of these noise vibrations change in their shapes in a variety of ways, and besides, in many cases, it is also difficult to specify the positions of generation thereof. As a result, noise vibration waveforms can not be removed in an appropriate manner thus giving rise to a possibility that knock detectability may get worse.

PRIOR ART REFERENCES

Patent Documents

First Patent Document: Japanese patent No. 4473171

SUMMARY OF THE INVENTION

In the conventional knock control apparatus for an internal combustion engine, as shown in the first patent document, knock vibration waveforms and noise vibration waveforms have been stored in advance, and a knock is detected by removing noise vibration waveforms from a vibration waveform detected by the knock sensor, but there has been a problem that it is difficult to remove, in an accurate manner, actual noise vibration waveforms which change in a variety of ways depending upon various kinds of conditions, thus making it impossible to improve knock detectability to a sufficient extent.

The present invention has been made in order to solve the problem as referred to above, and has for its object to provide a knock control apparatus for an internal combustion engine which has been improved in knock detectability to a sufficient extent by removing a variety of kinds of noise vibration waveforms generated resulting from an operation of the internal combustion engine in a simple and appropriate manner, without adapting the generation positions and shapes of the noise vibration waveforms.

A knock control apparatus of the internal combustion engine according to this invention is provided with: a knock sensor that detects a vibration of the internal combustion engine; a crank angle sensor that detects a crank angle of the internal combustion engine; a vibration waveform detection unit that detects a vibration waveform of a knock natural frequency component from a detection signal of the knock sensor by making it into association with the crank angle; a vibration waveform average value calculation unit that calculates a vibration waveform average value corresponding to a noise vibration waveform generated in a regular manner by carrying out filtering processing of the vibration waveform over a plurality of ignition cycles of the internal combustion engine; a noise vibration waveform removal unit that removes the noise vibration waveform by subtracting the vibration waveform average value from the vibration waveform; a knock determination threshold value calculation unit that calculates a knock determination threshold value based on a peak value of the vibration waveform after the noise vibration waveform has been removed; and a knock determination unit that determines whether a knock has occurred in the internal combustion engine, by making a comparison between the peak value and the knock determination threshold value.

According to the present invention, by detecting a vibration waveform characteristic of a knock from a knock sensor output, and subtracting a vibration waveform average value over a plurality of ignition cycles from the vibration waveform thus detected, it becomes possible to appropriately remove a variety of kinds of noise vibration waveforms generated resulting from the operation of the internal combustion engine, without adapting the generation positions and shapes of the noise vibration waveforms, thereby making it possible to improve knock detectability to a sufficient extent.

BEST MODE FOR CARRYING OUT THE INVENTION

First Embodiment

Figure 1:
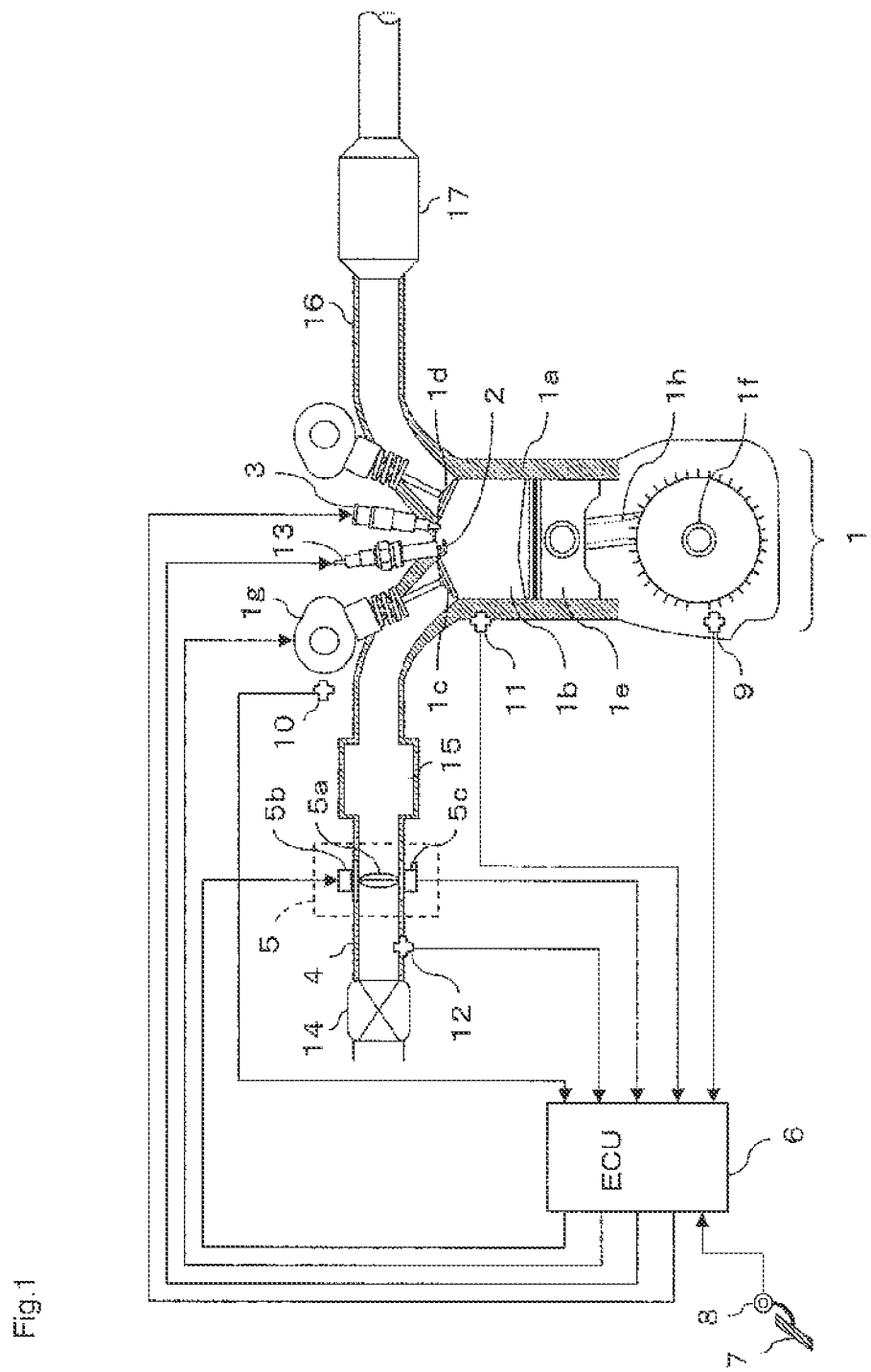
FIG. 1 is a block diagram showing the overall construction of a knock control apparatus for an internal combustion engine according to a first embodiment of the present invention.

Hereinafter, a first embodiment of the present invention will be explained in detail while referring to the accompanying drawings. FIG. 1 is a block diagram showing the overall construction of a knock control apparatus for an internal combustion engine according to a first embodiment of the present invention.

In FIG. 1, the knock control apparatus for an internal combustion engine is composed of an ECU (engine control unit) 6 which serves to control an operating state of an engine 1 (internal combustion engine).

The engine 1 is composed of a plurality of cylinders 1a. Here, only one cylinder 1a is shown representatively.

In a combustion chamber 1b of the cylinder 1a, there are arranged an intake valve 1c that opens and closes communication of the combustion chamber 1b with respect to an intake passage 4, an exhaust valve 1d that opens and closes communication of the combustion chamber 1b with respect to an exhaust manifold 16, a piston 1e that moves in the inside of the combustion chamber 1b, a crankshaft 1f, a cam shaft 1g that drives the intake valve 1c, a connecting rod 1h that connects the piston 1e with the crankshaft 1f, a spark plug 2, an injector 3, and a crank angle sensor 9 that is disposed in opposition to the crankshaft 1f. In addition, a knock sensor 11 is mounted on the engine 1, and a cam angle sensor 10 is arranged in the vicinity of the cam shaft 1g.

An electronically controlled throttle 5 is arranged in the intake passage 4. An air flow sensor 12 and an air cleaner 14 are arranged at the upstream side of the electronically controlled throttle 5. A surge tank 15 is arranged at the downstream side of the electronically controlled throttle 5.

In addition, a catalyst 17 is arranged at the downstream side of the exhaust manifold 16.

The electronically controlled throttle 5 is composed of a throttle valve 5a, a motor 5b for driving the throttle valve 5a, and a throttle position sensor 5c for detecting the degree of opening of the throttle valve 5a.

In addition, an accelerator position sensor 8 is mounted on an accelerator pedal 7 which is operated by a driver.

The crank angle sensor 9 serves to detect the crank angle of the crankshaft 1f according to the rotation of the crankshaft 1f. The cam angle sensor 10 serves to detect the degree of cam angle of the cam shaft 1g at an intake air side. The knock sensor 11 serves to detect the vibration of the engine 1, and inputs each its detection signal to the ECU 6.

The ECU 6 serves to drive and control the cam shaft 1g, the spark plug 2, the injector 3, and the electronically controlled throttle 5, based on detection signals from the various kinds of sensors.

The amount of intake air sucked into the engine 1 is regulated by means of the electronically controlled throttle 5 in the intake passage 4 under the control of the ECU 6.

Specifically, the ECU 6 obtains the detection signal of the accelerator position sensor 8 which serves to detect the amount of operation of the accelerator pedal 7, and sends a drive control signal to the motor 5b, so that the throttle valve 5a is thereby controlled to an appropriate degree of opening by feeding back a throttle valve opening signal from the throttle position sensor 5c.

Here, note that the ECU 6 obtains not only the detection signals of the accelerator position sensor 8, the crank angle sensor 9, the cam angle sensor 10, the air flow sensor 12, and the knock sensor 11, all of which are illustrated, but also detection signals from other various kinds of sensors (not shown), and calculates, based on these signals thus obtained, various amounts of control (i.e., controlled variables) such as ignition timing by the spark plug 2, an amount of fuel injection by the injector 3, etc.

According to this, based on the individual results of the calculation, the ECU 6 drives the injector 3 thereby to inject and supply fuel into the combustion chamber 1b, and at the same time, drives an ignition coil 13 connected to the spark plug 2 thereby to cause the spark plug 2 to discharge sparks from its plug gap, so that an air fuel mixture inside the combustion chamber 1b is made to burn.

After the flow rate of intake air, from which dust, garbage and the like have been removed by the air cleaner 14, is measured by means of the air flow sensor 12, the intake air is introduced into the surge tank 15, while passing through the electronically controlled throttle 5, and is further introduced from the surge tank 15 into the combustion chamber 1b through the intake valve 1c.

The intake air thus introduced into the combustion chamber 1b and the fuel injected from the injector 3 are mixed with each other to form an air fuel mixture, so that the mixture thus formed is then fired to burn by the spark discharge of the spark plug 2.

The combustion pressure of the air fuel mixture is conducted to the piston 1e, whereby the piston 1e is made to reciprocate, and the reciprocating motion of the piston 1e is then conducted to the crankshaft 1f through the connecting rod 1h, so that it is converted into rotary motion by means of the crankshaft 1f, and is thus taken out as a rotating output of the engine 1.

The air fuel mixture is burned or combusted to form exhaust gas, which is discharged into the exhaust manifold 16 through the exhaust valve 1d, and is purified by the catalyst 17, after which it is discharged into atmospheric air.

Next, an outline of the knock control which is carried out within the ECU 6 will be explained, while referring to FIG. 2.

Figure 2:
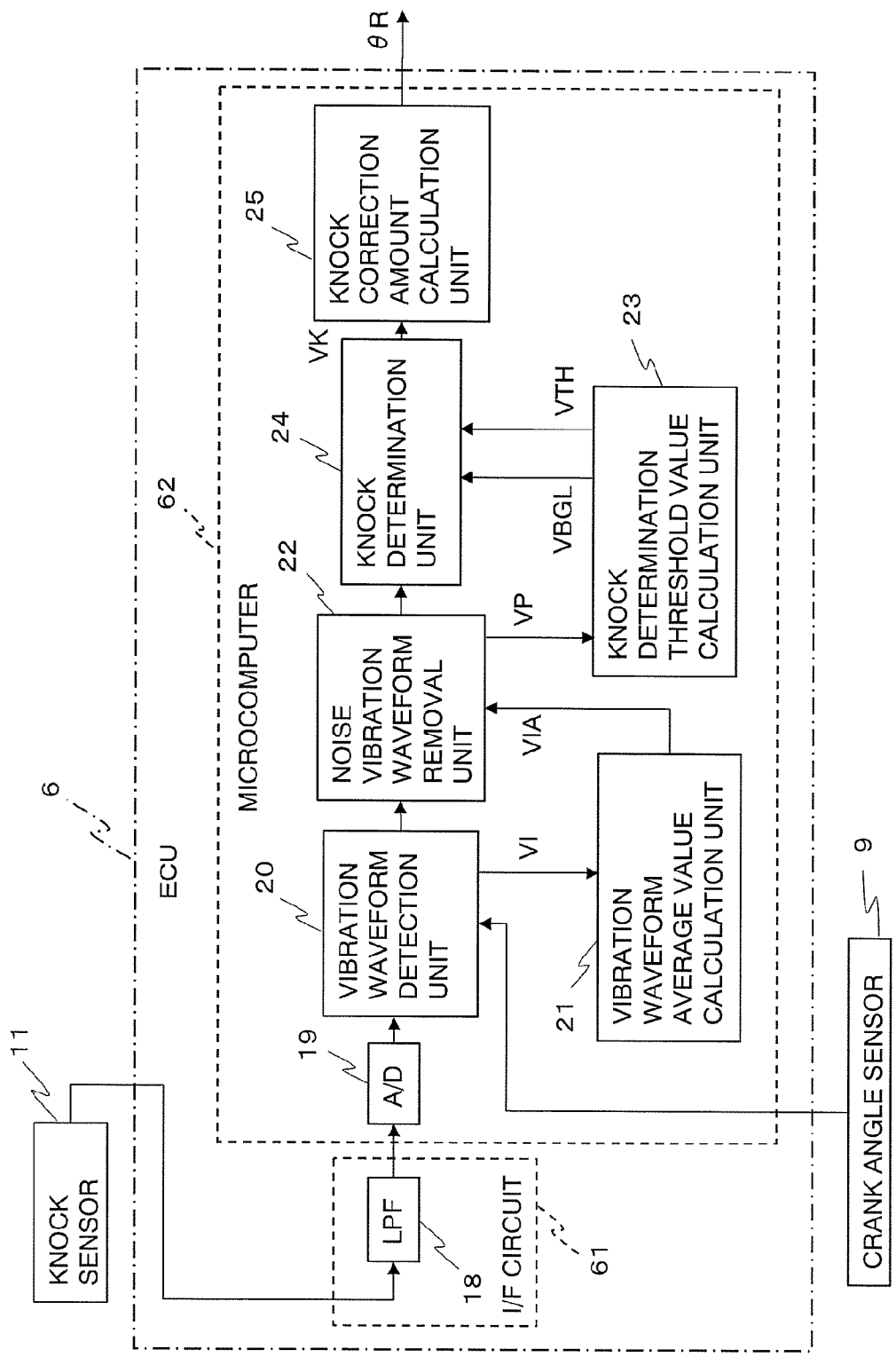
FIG. 2 is a functional block diagram showing essential parts of the knock control apparatus for an internal combustion engine according to the first embodiment of the present invention.

FIG. 2 is a functional block diagram showing essential parts of the knock control apparatus for an internal combustion engine according to the first embodiment of the present invention, wherein the specific functional configuration of the ECU 6 is shown.

In FIG. 2, a focus is placed on the configuration or construction related to a knock control part inside the ECU 6, whereas only the crank angle sensor 9 and the knock sensor 11 are shown as the various kinds of sensors.

In FIG. 2, the ECU 6 is composed of various kinds of I/F (interface) circuits (though only I/F circuit 61 is illustrated) and a microcomputer 62.

The I/F circuit 61 is provided with an LPF (low pass filter) 18, and serves to remove high frequency components from the vibration waveforms detected by the knock sensor 11, and input only vibration waveforms of low frequency components corresponding to knock components to the microcomputer 62.

The microcomputer 62 is provided with an A/D converter 19 that converts a vibration waveform (analog signal) received through the LPF 18 into a digital signal, a vibration waveform detection unit 20, a vibration waveform average value calculation unit 21, a noise vibration waveform removal unit 22, a knock determination threshold value calculation unit 23, a knock determination unit 24, and a knock correction amount calculation unit 25.

Various kinds of calculation processing units inside the microcomputer 62 are composed of a ROM (read only memory) area in which control programs and control parameters are stored, a RAM (random access memory) area in which variables at the time when a program is executed are stored, and a CPU (central processing unit) which executes the programs.

The vibration waveform detection unit 20 detects vibration waveforms in a prescribed crank angle region corresponding to a knock occurrence region, from the vibration waveform through the A/D converter 19, and the crank angle from the crank angle sensor 9.

The vibration waveform average value calculation unit 21 calculates a vibration waveform average value VIA (to be describes later) corresponding to the noise vibration waveforms by carrying out filtering processing of the vibration waveform detected by the vibration waveform detection unit 20.

The noise vibration waveform removal unit 22 subtracts the vibration waveform average value VIA from the vibration waveform detected by the vibration waveform detection unit 20, and generates a peak value VP of the vibration waveform from which the noise vibration waveforms have been removed.

The knock determination threshold value calculation unit 23 calculates a knock determination threshold value VTH from the peak value VP of the vibration waveform after the removal of the noise vibration waveforms.

The knock determination unit 24 generates a knock signal corresponding to a knock intensity VK (to be describes later) by making a comparison between the peak value VP and the knock determination threshold value VTH.

The knock correction amount calculation unit 25 calculates, for example, a knock correction amount θR for correcting to retard the ignition timing in response to a knock signal indicative of the occurrence of a knock, and inputs it to a drive circuit (not shown) of the ignition coil 13.

The A/D converter 19 in the microcomputer 62 carries out an A/D conversion at every fixed interval of time (e.g., 10 μs, or 20 μs).

On the other hand, the LPF 18 in the I/F circuit 61 also has a gain conversion function, in order to make it possible for the A/D converter 19 to take in vibration components of all levels.

For example, in order to set the center of the vibration components to 2.5 V, the LPF 18 is biased to 2.5 V, so that the vibration component should fall within a range of 0 V-5 V around a center of 2.5 V, i.e., it is amplified around the center of 2.5 V in cases where the vibration component is small, whereas, on the contrary, it is attenuated around the center of 2.5 V in cases where the vibration component is large. In this manner, the LPF 18 serves to input the vibration waveforms of all levels to the A/D converter 19.

Here, it may be constructed such that the processing of the A/D converter 19 is not carried out at every fixed interval of time, but is always carried out, so that only the data in a crank angle range or zone required in the subsequent calculation processing is inputted to the vibration waveform detection unit 20. Alternatively, it may be constructed such that A/D conversion processing may be carried out only in the crank angle zone required for the subsequent calculation processing, and the result thus obtained may be inputted to the vibration waveform detection unit 20.

Subsequently, the vibration waveform detection unit 20 conducts a frequency analysis according to digital signal processing, and calculates the vibration waveform of a knock natural frequency component.

Here, note that as the digital signal processing of the vibration waveform detection unit 20, well-known calculation processing such as, for example, so-called discrete Fourier transform (DFT), short-time Fourier transform (STFT), etc., is used. According to this, the spectrum of the knock natural frequency component (hereinafter referred to as a "vibration strength VI") is calculated as a vibration waveform at every predetermined period of time (or at every prescribed crank angle).

In addition, the knock natural frequency component may be extracted by using an IIR (infinite impulse response) filter, an FIR (finite impulse response) filter, or the like, as the above-mentioned digital signal processing.

Here, note that the calculation operation of the vibration waveform detection unit 20 may be carried out, while at the same time performing the processing of the A/D converter 19, or it may be carried out in a batch or collective manner by interrupt processing in synchronization with the rotation of the engine 1.

As mentioned above, the vibration of the engine 1 includes, in addition to a knock vibration resulting from a knock, a noise vibration resulting from the operation of the engine 1, wherein the noise vibration may be superposed on the knock natural frequency.

In addition, the noise vibration includes vibration generated resulting from the operation of the component parts such as the injector 3, the intake valve 1c, the exhaust valve 1d, etc., mounted on the engine 1, vibration inherent in the engine 1 such as generated resulting from the operation of the piston 1e, etc., and vibration generated resulting from the combustion of the air fuel mixture in the combustion chamber 1b.

Due to the fact that such noise vibration is superposed on the vibration waveform, there is a possibility that only by simply detecting the vibration waveform, a knock may be unable to be determined with a high degree of accuracy in the knock determination unit 24 inside the microcomputer 62.

Accordingly, the vibration waveform average value calculation unit 21 in the ECU 6 calculates the vibration waveform average value VIA corresponding to the noise vibration waveforms by carrying out filtering processing over a plurality of ignition cycles with respect to the vibration waveform in a predetermined ignition cycle detected by the vibration waveform detection unit 20.

Here, note that a vibration waveform average value VIA[n], which is an average value of the vibration strength VI, is calculated according to a filtering arithmetic operation as shown by the following expression (1), using an average value VIA[n−1] at the last timing, a vibration strength VI[n] at the current timing, and a filter factor KVIA.

$$VIA[n]=KVIA \times VIA[n-1]+(1-KVIA) \times VI[n] \quad (1)$$

However, in expression (1) above, [n] means processing at the current ignition timing, and [n−1] means processing at the last ignition timing.

The vibration strength VI is a value calculated by the vibration waveform detection unit 20 at every predetermined crank angle, and similarly, the average value of the vibration strength VI (the vibration waveform average value VIA) is a value calculated at every predetermined crank angle.

Subsequently, the noise vibration waveform removal unit 22 generates the peak value VP of the vibration waveform from which the noise vibration waveform is removed, by subtracting the vibration waveform average value VIA calculated by the vibration waveform average value calculation unit 21 from the vibration waveform detected by the vibration waveform detection unit 20.

In addition, the knock determination threshold value calculation unit 23 calculates the knock determination threshold value VTH based on the peak value VP of the vibration waveform after removal of the noise vibration waveform supplied from the noise vibration waveform removal unit 22, by the use of the following expression (2) through expression (5).

First, the knock determination threshold value calculation unit 23 calculates a background level VBGL[n] corresponding to an average value of the peak value VP, as shown by the following expression (2), by carrying out the filtering processing using the filter factor KBGL with respect to a peak value VP[n] at every stroke of the engine 1.

$$VBGL[n]=KBGL \times VBGL[n-1]+(1-KBGL) \times VP[n] \quad (2)$$

Subsequently, the knock determination threshold value calculation unit 23 calculates a variance VVAR[n] of the peak value VP[n], as shown by the following expression (3), by the use of the filter factor KVAR.

$$VVAR[n]=KVAR\times VVAR[n-1]+(1-KVAR)\times(VP[n]-VBGL[n]) \quad (3)$$

In addition, a standard deviation VSGM[n] of the peak value VP[n] is calculated, as shown by the following expression (4).

$$VSGM[n]=VVAR[n]^{1/2} \quad (4)$$

Finally, the knock determination threshold value calculation unit 23 calculates a knock determination threshold value VTH[n], as shown by the following expression (5), by using the background level VBGL[n] obtained by the expression (2), the standard deviation VSGM[n] obtained by the expression (3) and the expression (4), and a knock determination threshold value calculation coefficient KTH.

$$VTH[n]=VBGL[n]+KTH\times VSGM[n] \quad (5)$$

Then, in order to determine the presence or absence of the occurrence of a knock, the knock determination unit 24 calculates a knock intensity VK[n], as shown by the following expression (6), by the use of the peak value VP[n], the background level VBGL[n], and the knock determination threshold value VTH[n].

$$VK[n]=(VP[n]-VBGL[n])/(VTH[n]-VBGL[n]) \quad (6)$$

In cases where VK[n] calculated by the expression (6) indicates "VK[n]>0", a determination is made that a knock has occurred.

Thereafter, the knock correction amount calculation unit 25 calculates a knock correction amount θR[n] according to the knock intensity VK[n], by the following expressions (7) and (8).

First, the knock correction amount calculation unit 25 calculates an amount of retard angle ΔθR[n] corresponding to a knock intensity at every one ignition by the following expression (7), by the use of a retard angle amount reflection coefficient KR and a maximum amount of retard angle θ min.

$$\Delta\theta R[n]=\max(-VK[n]\times KR,\theta\min) \quad (7)$$

Also, the knock correction amount calculation unit 25 calculates an amount of knock correction θR[n] of ignition timing by integrating the amount of retardation ΔθR[n] at every one ignition, by the use of an advance angle return coefficient KA[n] and a maximum amount of advance angle θ max.

$$\theta R[n]=\min(\theta R[n-1]+\Delta\theta R[n]+KA,\theta\max) \quad (8)$$

In cases where a determination is made based on the maximum amount of advance angle θ max in the expression (8) that a knock has not occurred, the knock correction amount calculation unit 25 can cause the ignition timing to return to the advanced timing.

According to a series of processing described above, it becomes possible to remove a variety of kinds of noise vibration waveforms generated resulting from the operation of the engine 1 in an appropriate manner, without adapting the generation positions and shapes of the noise vibration waveforms, thereby making it possible to improve knock detectability.

Here, note that the above-mentioned individual expressions are only an example for explaining an operation of the first embodiment of the present invention, and the present invention is not limited to these expressions.

Next, supplementary reference will be made to processing steps until the knock determination threshold value VTH is calculated by removing the noise vibration waveform from the detected vibration waveform, while referring to individual explanatory views of FIG. 3 through FIG. 10.

In each of FIG. 3 through FIG. 8, a waveform (c) at an upper side is a result calculated in the case where no consideration is taken into individually different various noise vibrations, wherein it is shown for contrast with a result (C) calculated according to the first embodiment of the present invention.

Here, reference will be made to the vibration waveforms in cases where the crank angle position is defined with respect to TDC (Top Dead Center) and ATDC (After Top Dead Center), and a knock detection zone τk is set to TDC (=0 [deg. ATDC])–60 [deg. ATDC].

First, reference will be made to processing steps from the removal of the noise vibration waveform until the calculation of the knock determination threshold value in the case where only the noise resulting from combustion (hereinafter referred to as "combustion noise") is superposed (in cases where there is substantially no noise superposition), while referring to FIG. 3 and FIG. 4.

Figure 3:
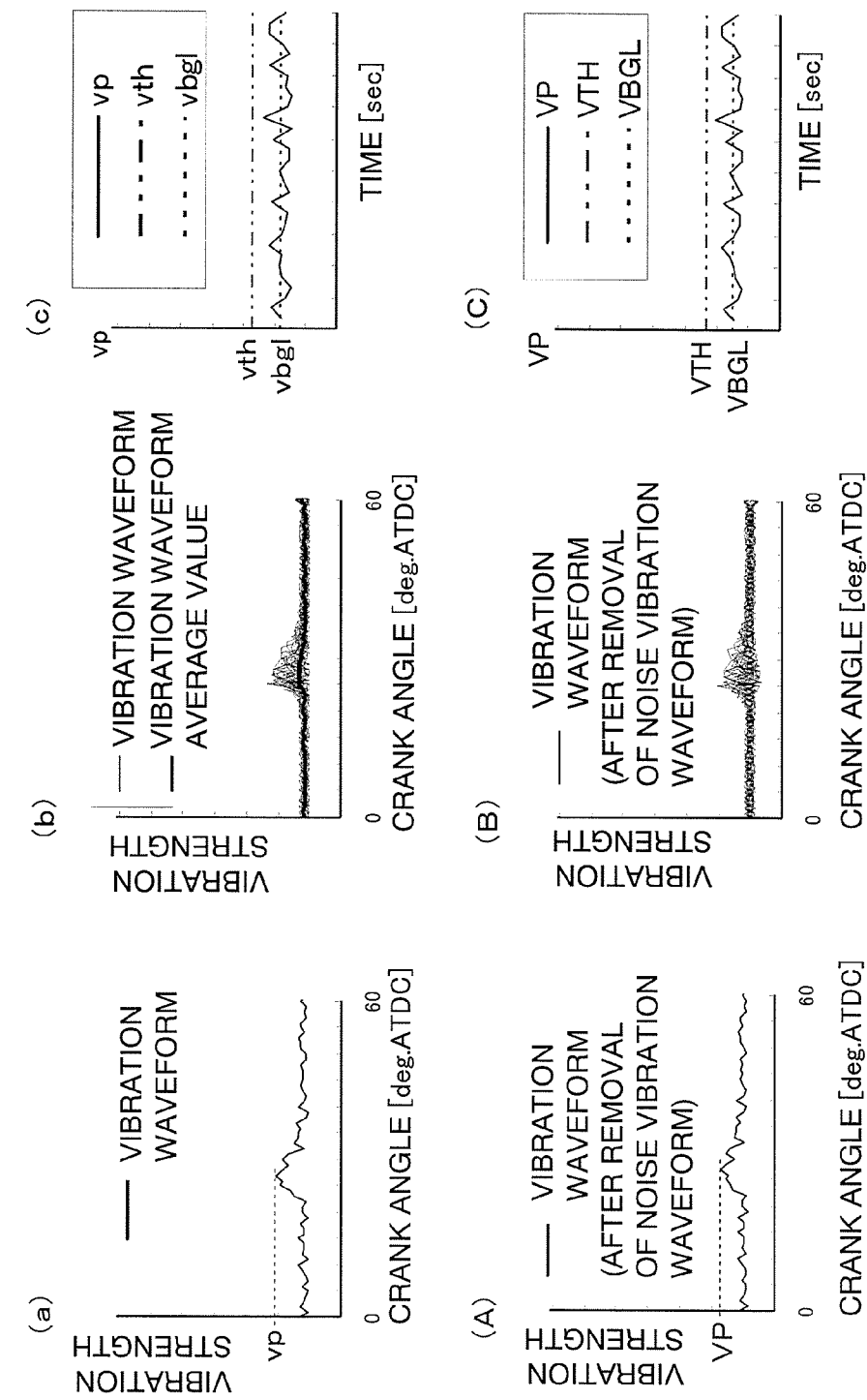
FIG. 3 includes (a) through (c) and (A) through (C) which are explanatory views showing processing steps from the removal of noise vibration waveforms to the calculation of a knock determination threshold value under the condition that no knock has occurred and there is no superposition of noise, according to the first embodiment of the present invention.
Figure 4:
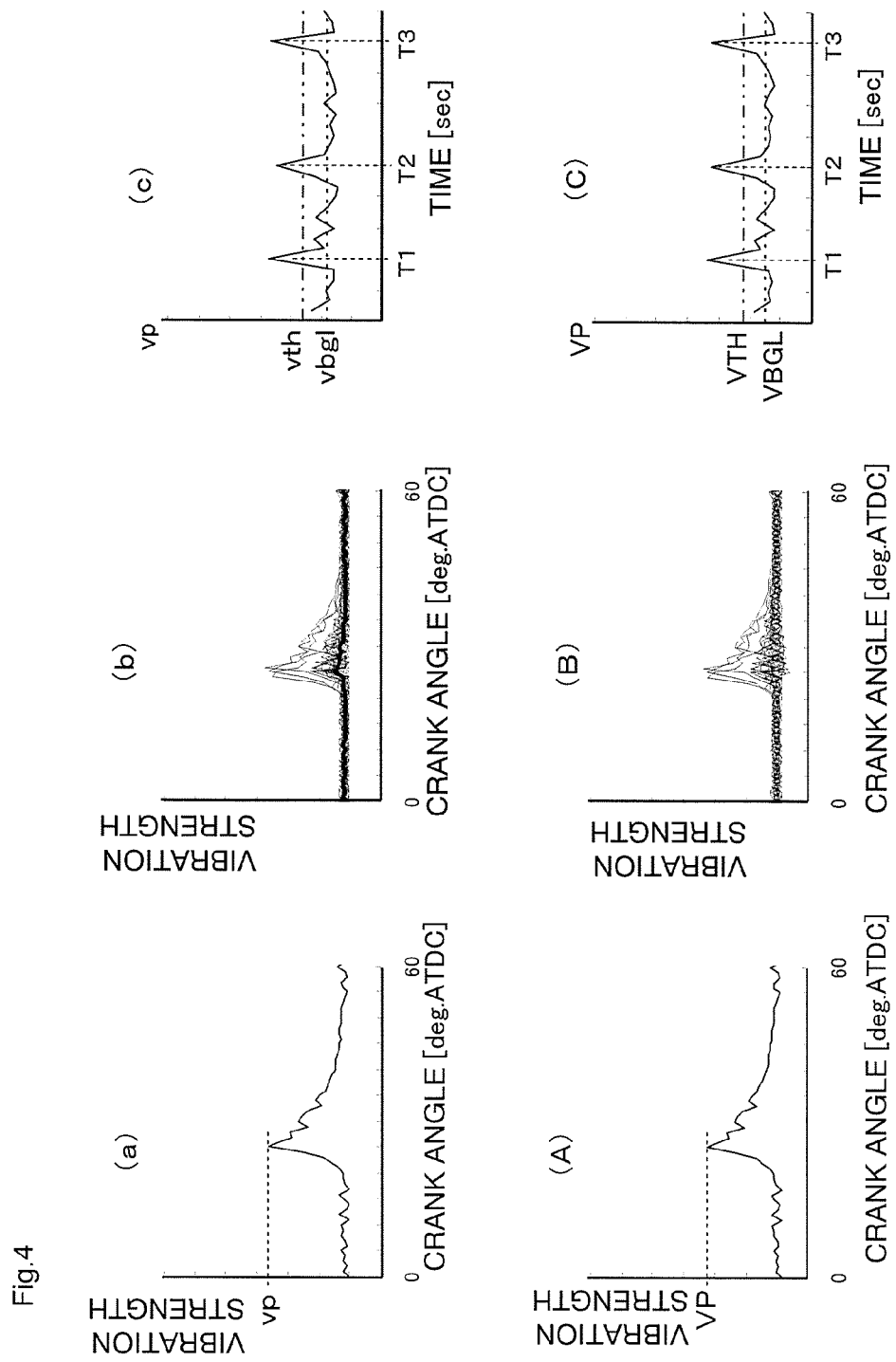
FIG. 4 includes (a) through (c) and (A) through (C) which are explanatory views showing processing steps from the removal of noise vibration waveforms to the calculation of a knock determination threshold value under the condition that a knock has occurred and there is no superposition of noise, according to the first embodiment of the present invention.

FIG. 3 includes explanatory views in the case where no knock has occurred, and FIG. 4 includes explanatory views in the case where a knock has occurred at individual time points T1, T2 and T3, respectively.

In this case, there is no superposition of noise, so a remarkable difference does not occur between the calculation results (FIG. 3(c), FIG. 4(c)) of a conventional apparatus, and the calculation results (FIG. 3(C), FIG. 4(C)) according to the first embodiment of the present invention, and no problem occurs in knock determination.

(a) in FIG. 3 and (a) in FIG. 4 (hereinafter referred to as FIG. 3(a) and FIG. 4(a), respectively) each show an example of the detected waveform of the vibration waveform detection unit 20, i.e., the vibration waveform thereof with respect to the crank angle in one ignition cycle.

(b) in FIG. 3 and (b) in FIG. 4 (hereinafter referred to as FIG. 3(b) and FIG. 4(b), respectively) each show the vibration waveforms (thin lines) with respect to the crank angle in a plurality of ignition cycles in a superposed manner, and at the same time, show the vibration waveform average value VIA (thick line) which is calculated by the vibration waveform average value calculation unit 21.

(c) in FIG. 3 and (c) in FIG. 4 (hereinafter referred to as FIG. 3(c) and FIG. 4(c), respectively) each show a timing waveform with a background level vbgl (dotted line) and a knock determination threshold value vth (two-dot chain line) which are calculated by the conventional apparatus, wherein the timing waveform is shown in association with peak values vp (solid line) of the vibration waveform from the vibration waveform detection unit 20.

On the other hand, (A) in FIG. 3 and (A) in FIG. 4 (hereinafter referred to as FIG. 3(A) and FIG. 4(A), respectively) each show the output waveform of the noise vibration waveform removal unit 22, wherein there are shown the vibration waveforms with respect to the crank angle in one ignition cycle after the vibration waveform average values VIA (refer to the thick lines in FIG. 3(b) and FIG. 4(b), respectively) are removed from the vibration waveforms of FIG. 3(a) and FIG. 4(a), respectively.

(B) in FIG. 3 and (B) in FIG. 4 (hereinafter referred to as FIG. 3(B) and FIG. 4(B), respectively) each show the vibration waveform after the removal of the noise vibration waveform by means of the noise vibration waveform removal unit 22 with respect to the crank angle in a plurality of ignition cycles in a superposed manner.

(C) in FIG. 3 and (C) in FIG. 4 (hereinafter referred to as FIG. 3(C) and FIG. 4(C), respectively) correspond to FIG. 3(B) and FIG. 4(B), respectively, and each show a timing waveform with a background level VBGL (dotted line) and a knock determination threshold value VTH (two-dot chain line), which are calculated by the knock determination threshold value calculation unit 23, wherein the timing waveforms are shown in association with peak values VP (solid line) of the vibration waveforms after the removal of noise vibration.

The detection signal of the knock sensor 11 in the case where there is no superposition of noise and no knock has occurred takes a vibration waveform including only combustion noise, as shown in FIG. 3(a).

In the conventional apparatus, the background level vbgl and the knock determination threshold value vth are calculated, as shown in FIG. 3(c), based on the peak value vp of the vibration waveform including combustion noise, as shown in FIG. 3(a) (or thin line in FIG. 3(b)).

On the other hand, in the first embodiment of the present invention, the vibration waveform average value VIA (thick line in FIG. 3(b)) with respect to the crank angle is first calculated, as an average value waveform corresponding to the noise vibration waveform, in the vibration waveform average value calculation unit 21 by the use of the above-mentioned expression (1) in every plurality of ignition cycles.

At this time, the vibration waveform of the combustion noise is different for every ignition cycle, and when the vibration waveforms in the individual ignition cycles are shown one over another in a superposed manner, as shown in FIG. 3(b), a change of each vibration waveform with respect to the crank angle becomes large at the position of generation of combustion noise (i.e., in the vicinity of 30 [deg. ATDC]).

That is, the vibration waveform average value VIA, which is obtained by carrying out filtering processing of the vibration waveform over the plurality of ignition cycles, is not affected to a large extent by the influence of the vibration waveform due to the combustion noise in each ignition cycle, as a result of which it is possible to calculate the noise vibration waveform on which only the combustion noise generated regularly is superposed, in an appropriate manner.

Accordingly, by subtracting the vibration waveform average value VIA (thick line in FIG. 3(b)) from the vibration waveform in FIG. 3(a) (or thin line in FIG. 3(b)), it is possible to remove the noise vibration waveform in an appropriate manner, as shown in FIG. 3(A) (or FIG. 3(B)).

As a result, it is possible to calculate the background level VBGL and the knock determination threshold value VTH based on the peak value VP of the vibration waveform due to the combustion noise after the removal of the noise vibration waveform, as shown in FIG. 3(C).

However, in the case of FIG. 3 (i.e., only combustion noise is superposed and no knock has occurred), noise vibration is not erroneously detected as a knock, in either of the conventional apparatus and the apparatus according to the first embodiment of the present invention, as shown in FIG. 3(c) and FIG. 3(C).

On the other hand, the detection signal of the knock sensor 11 in the case where there is no superposition of noise and a knock has occurred takes a vibration waveform including a vibration component resulting from the knock, as shown in FIG. 4(a).

In this case, in the conventional apparatus, the knock determination threshold value with is calculated based on the peak value vp of the vibration waveform due to the knock or combustion noise in FIG. 4(a) (or thin line in FIG. 4(b)), as shown in FIG. 4(c).

On the other hand, in the first embodiment of the present invention, similarly as mentioned above, the vibration waveform average value VIA (thick line in FIG. 4(b)) with respect to the crank angle is calculated, as a noise vibration waveform, by means of the vibration waveform average value calculation unit 21.

In this case, too, the vibration waveform due to the knock or combustion noise is different for every ignition cycle, so when the vibration waveform is shown in a superposed manner, as shown in FIG. 4(b), the change of the vibration waveform with respect to the crank angle becomes large, at the generation position of the knock or combustion noise, as a result of which the vibration waveform average value VIA is not affected to a large extent by the influence of the vibration waveform due to the knock or combustion noise in each ignition cycle, and hence, it is possible to calculate the noise vibration waveform due to the combustion noise generated regularly, in an appropriate manner.

Accordingly, by subtracting the vibration waveform average value VIA in FIG. 4(b) from the vibration waveform in FIG. 4(a) (or FIG. 4(b)), it is possible to remove the noise vibration waveform in an appropriate manner, as shown in FIG. 4(A) (or FIG. 4(B)).

As a result, it is possible to calculate the background level VBGL and the knock determination threshold value VTH based on the peak value VP of the vibration waveform due to the knock or combustion noise after the removal of the noise vibration waveform has been removed, as shown in FIG. 4(c).

However, in the case of FIG. 4 (i.e., only combustion noise is superposed and a knock has occurred), it is possible to detect the knock with a high degree of accuracy, in either of the conventional apparatus and the apparatus according to the first embodiment of the present invention, as shown in FIG. 4(c) and FIG. 4(C).

Next, reference will be made to processing steps from the removal of the noise vibration waveform until the calculation of the knock determination threshold value in the case where not only combustion noise but also noise resulting from other causes is superposed (in cases where there is substantially a superposition of noise), while referring to FIG. 5 and FIG. 6.

Figure 5:
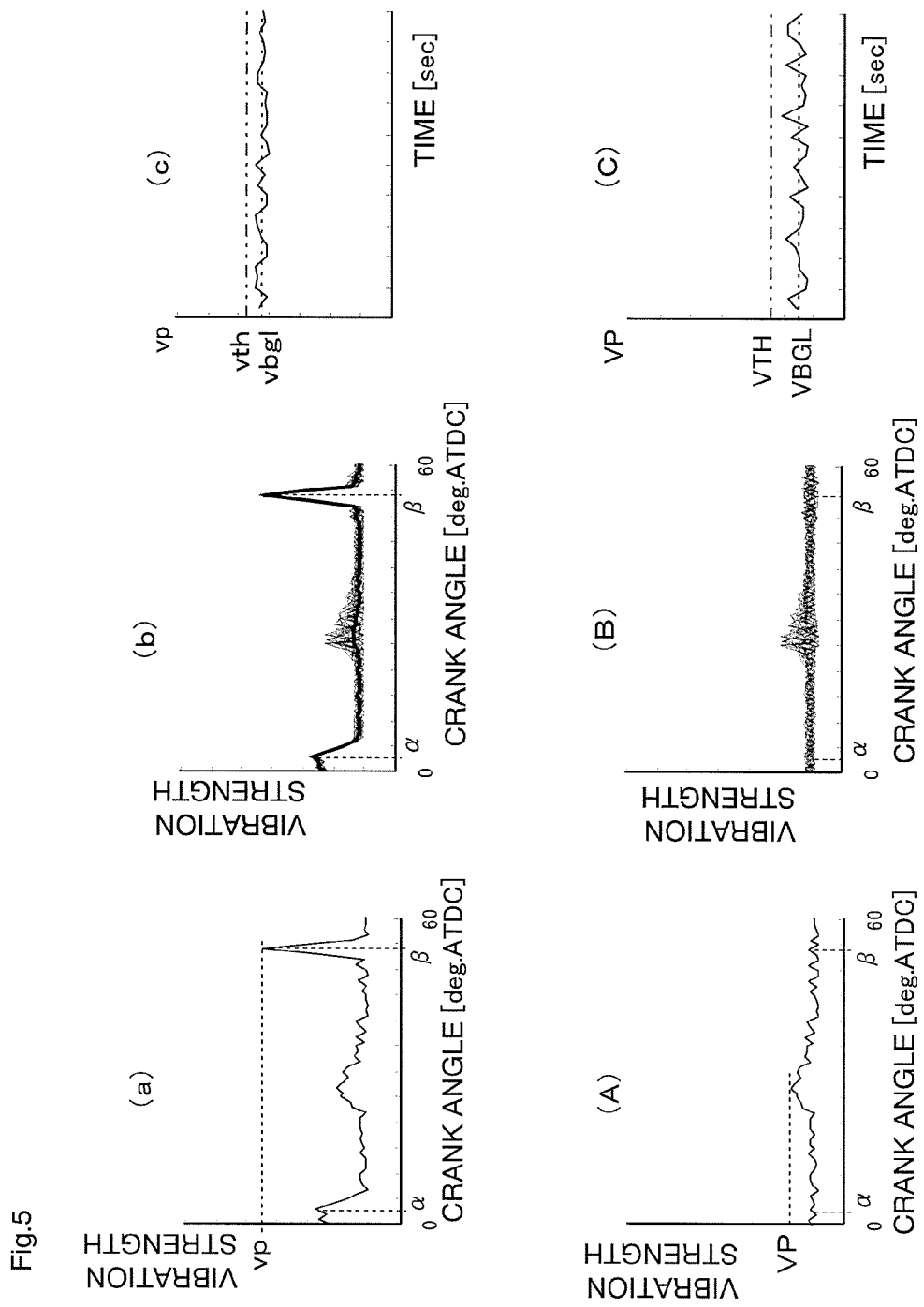
FIG. 5 includes (a) through (c) and (A) through (C) which are explanatory views showing processing steps from the removal of noise vibration waveforms to the calculation of a knock determination threshold value under the condition that no knock has occurred and there is a superposition of noise, according to the first embodiment of the present invention.
Figure 6:
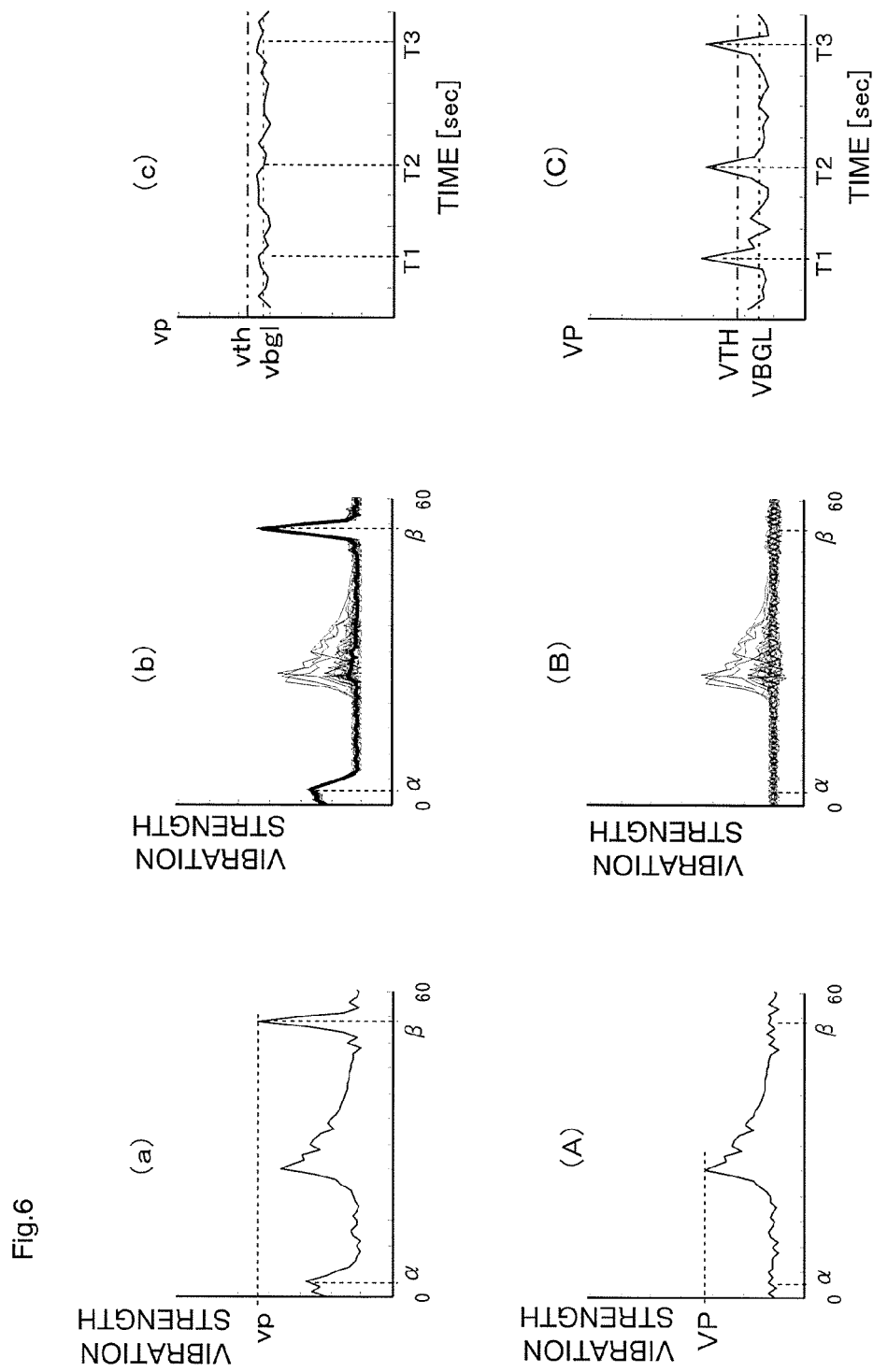
FIG. 6 includes (a) through (c) and (A) through (C) which are explanatory views showing processing steps from the removal of noise vibration waveforms to the calculation of a knock determination threshold value under the condition that a knock has occurred and there is a superposition of noise, according to the first embodiment of the present invention.

FIG. 5 includes explanatory views in the case where no knock has occurred, and FIG. 6 includes explanatory views in the case where a knock has occurred at individual time points T1, T2 and T3, respectively.

Here, as a specific example, there is shown a case in which a noise vibration inherent in the engine 1 resulting from the movement of the piston 1e (hereinafter referred to as "slap noise") is superposed at a crank angle α (in the vicinity of 3 [deg. ATDC]) in the knock detection zone τk, and a noise vibration resulting from the operation of the injector 3 (hereinafter referred to as "injector noise") is superposed at a crank angle (in the vicinity of 55 [deg. ATDC]).

(a) in FIG. 5 (hereinafter referred to as FIG. 5(a)) and (a) in FIG. 6 (hereinafter referred to as FIG. 6(a)) each show an example of a vibration waveform with respect to the crank angle in one ignition cycle detected by the vibration waveform detection unit 20.

(b) in FIG. 5 (hereinafter referred to as FIG. 5(b)) and (b) in FIG. 6 (hereinafter referred to as FIG. 6(b)) each show the vibration waveforms (thin lines) with respect to the crank angle in a plurality of ignition cycles in a superposed manner, and at the same time, show the vibration waveform average value VIA (thick line) which is calculated by the vibration waveform average value calculation unit 21.

(c) in FIG. 5 (hereinafter referred to as FIG. 3(c)) and (c) in FIG. 6 (hereinafter referred to as FIG. 6(c)) each show a timing waveform with a background level vbgl (dotted line)

and a knock determination threshold value vth (two-dot chain line) which are calculated by the conventional apparatus, wherein the timing waveform is shown in association with peak values vp (solid line) of the vibration waveform (FIG. 5(a), FIG. 6(a)) from the vibration waveform detection unit 20.

On the other hand, (A) in FIG. 5 (hereinafter referred to as FIG. 5(A)) and (A) in FIG. 6 (hereinafter referred to as FIG. 6(A)) each show the output waveform of the noise vibration waveform removal unit 22, wherein there are shown the vibration waveforms with respect to the crank angle in one ignition cycle after the vibration waveform average values VIA (the thick lines in FIG. 5(b) and FIG. 6(b), respectively) are removed from the vibration waveforms of FIG. 5(a) and FIG. 6(a), respectively.

(B) in FIG. 5 (hereinafter referred to as FIG. 5(B)) and (B) in FIG. 6 (hereinafter referred to as FIG. 6(B)) each show the vibration waveform after the removal of the noise vibration waveform by means of the noise vibration waveform removal unit 22 with respect to the crank angle in a plurality of ignition cycles in a superposed manner.

(C) in FIG. 5 (hereinafter referred to as FIG. 5(C)) and (C) in FIG. 6 (hereinafter referred to as FIG. 6(C)) correspond to FIG. 5(B) and FIG. 6(B), respectively, and each are a timing waveform showing a background level VBGL (dotted line) and a knock determination threshold value VTH (two-dot chain line), which are calculated by the knock determination threshold value calculation unit 23, wherein the timing waveforms are shown in association with peak values VP (solid line) of the vibration waveforms after the removal of noise vibration.

The detection signal of the knock sensor 11 in the case where there is a superposition of noise (slap noise, injector noise) and no knock has occurred becomes a vibration waveform which includes slap noise at the crank angle α and injector noise at the crank angle β, in addition to combustion noise, as shown in FIG. 5(a).

In the conventional apparatus, the background level vbgl and the knock determination threshold value vth are calculated based on the peak value vp of the vibration waveform due to the injector noise (at the crank angle β) in FIG. 5(a) (or thin line in FIG. 5(b)), as shown in FIG. 5(c).

On the other hand, in the first embodiment of the present invention, first, the vibration waveform average value VIA (thick line in FIG. 5(b)) with respect to the crank angle is calculated, as a noise vibration waveform, by means of the vibration waveform average value calculation unit 21.

At this time, the vibration waveforms of the slap noise and the injector noise are of the substantially identical shapes for every ignition cycle, and when the individual vibration waveforms are shown in a superposed manner, as in FIG. 5(b), the changes of the vibration waveforms with respect to the crank angle at the generation positions of the slap noise and the injector noise (i.e., at the crank angles α, β) are small, thus giving a large influence on the vibration waveform average value VIA.

On the other hand, the vibration waveform due to the combustion noise is different to a large extent for every ignition cycle, as mentioned above, and when the vibration waveform is shown in a superposed manner, as shown in FIG. 5(b), the change of the vibration waveform with respect to the crank angle is large, at the generation position of the knock or combustion noise (30 [deg. ATDC]), so that the vibration waveform average value VIA is not affected to a large extent by the influence of the vibration waveform due to the combustion noise for every ignition cycle.

Accordingly, the noise vibration waveforms due to the slap noise, the injector noise, and the regularly generated combustion noise can be calculated in an appropriate manner, and hence, by subtracting the vibration waveform average value VIA of FIG. 5(b) (thick line in FIG. 5(b)) from the vibration waveform in FIG. 5(a) (or thin line in FIG. 5(b)), it is possible to remove the noise vibration waveform in an appropriate manner, as shown in FIG. 5(A) (or FIG. 5(B)).

As a result of this, it is possible to calculate the background level VBGL and the knock determination threshold value VTH based on the peak value VP of the vibration waveform due to the combustion noise after the noise vibration waveform has been removed, as shown in FIG. 5(C).

In cases where there is a superposition of noise and no knock has occurred, as shown in FIG. 5, noise vibration is not erroneously detected as a knock, in either of the conventional apparatus and the apparatus according to the first embodiment of the present invention, as shown in FIG. 5(c) and FIG. 5(C).

However, in the case of the conventional apparatus (FIG. 5(c)), the level of the peak value vp and the knock determination threshold value vth become larger in comparison with the case where there is no superposition of noise (FIG. 3(c)), under the influence of injector noise (at the crank angle β), and hence, there is a possibility that noise vibration may be erroneously detected as a knock.

For example, in cases where a change is made from a state in which injector noise is not superposed on the knock detection zone τk into a state in which injector noise is superposed on the knock detection zone τk, there will be a possibility that the knock determination threshold value vth to be calculated by means of filtering processing may be late to follow the change, and the peak value vp may exceed the knock determination threshold value vth, thus causing the injector noise to be erroneously detected as a knock.

Here, referring to FIG. 9 and FIG. 10, a supplementary explanation will be made to the calculation steps for the vibration waveform average value VIA, in the case where a change has been made from a state in which injector noise is not superposed on the knock detection zone τk into a state in which injector noise is superposed on the knock detection zone τk.

Figure 9:
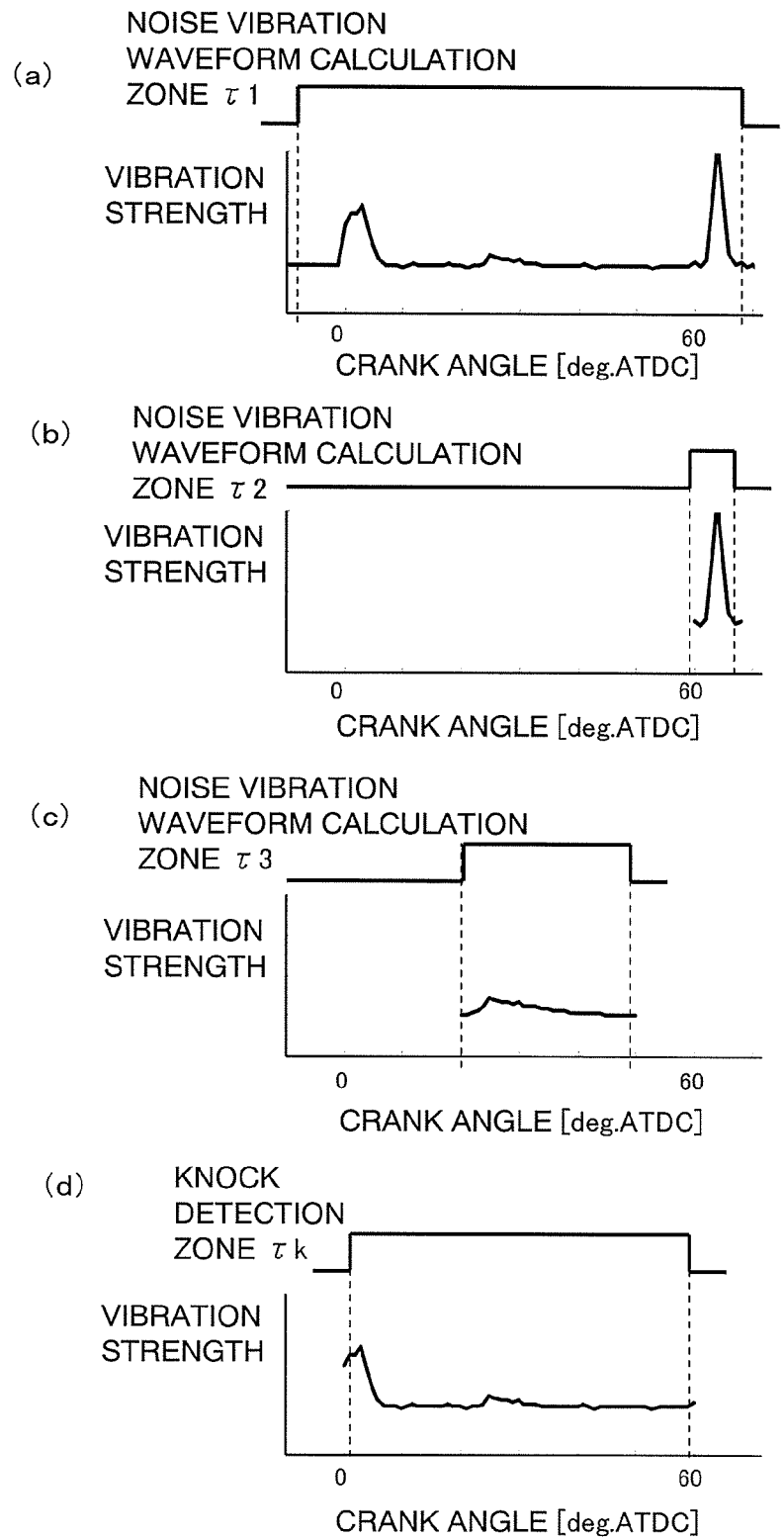
FIG. 9 includes (a) through (d) which are explanatory views showing the calculation steps of a vibration waveform average value in the case where injector noise is not superposed on a knock detection zone according to the first embodiment of the present invention.

FIG. 9 includes (a) through (d) (hereinafter referred to as FIG. 9(a) through FIG. 9(d), respectively) which are timing waveforms showing the calculation steps of the vibration waveform average value VIA, in the case where injector noise is not superposed on the knock detection zone τk (0-60 [deg. ATDC]).

In addition, FIG. 10 includes (a) through (d) (hereinafter referred to as FIG. 10(a) through FIG. 10(d), respectively) which are timing waveforms showing the calculation steps of the vibration waveform average value VIA, in the case where injector noise is superposed on the knock detection zone τk.

FIG. 9(a) and FIG. 10(a) show vibration waveform average values which are calculated in the noise vibration waveform calculation zone τ1 (a crank angle zone of approximately −10-70 [deg. ATDC], experimentally obtained in advance on the basis of the crank angle).

FIG. 9(b) and FIG. 10(b) show vibration waveform average values which are calculated in the noise vibration waveform calculation zone τ2 (a crank angle zone of approximately 60-70 [deg. ATDC], experimentally obtained in advance on the basis of the injection timing of the injector 3).

FIG. 9(c) and FIG. 10(c) show vibration waveform average values which are calculated in the noise vibration waveform calculation zone τ3 (a crank angle zone of approximately 20-50 [deg. ATDC], experimentally obtained in advance on the basis of the ignition timing of the spark plug 2).

FIG. 9(*d*) shows a maximum value of the vibration waveform average values of FIGS. 9(*a*)-9(*c*) in the knock detection zone τk (0-60 [deg. ATDC]), which is a final vibration waveform average value VIA calculated by the vibration waveform average value calculation unit 21.

Figure 10:
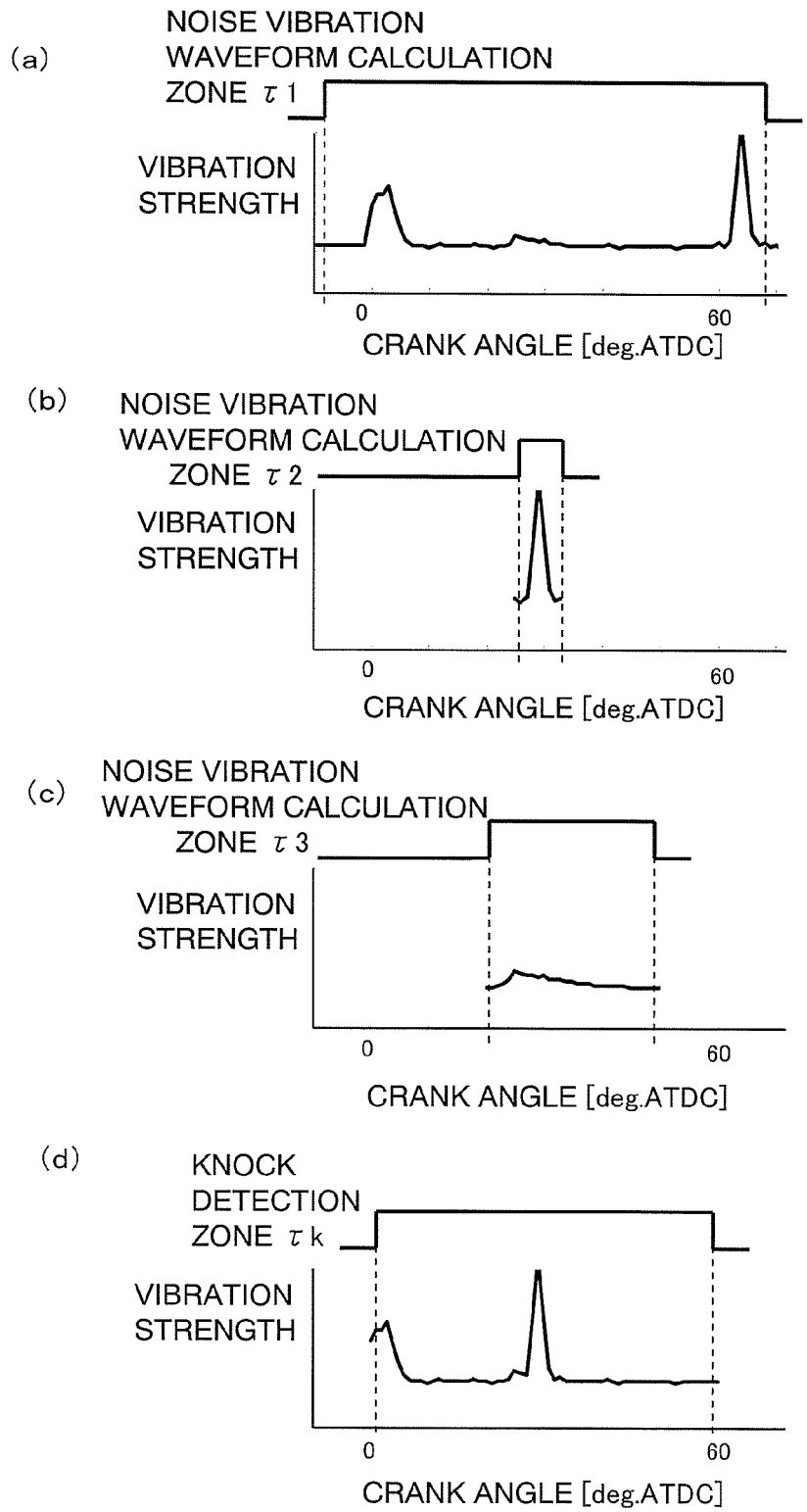
FIG. 10 includes (a) through (d) which are explanatory views showing the calculation steps of the vibration waveform average value in the case where injector noise is superposed on the knock detection zone according to the first embodiment of the present invention.

Similarly, FIG. 10(*d*) shows a maximum value of the vibration waveform average values of FIGS. 10(*a*)-10(*c*) in the knock detection zone τk, which is a final vibration waveform average value VIA calculated by the vibration waveform average value calculation unit 21.

In the state where injector noise is not superposed on the knock detection zone τk, as shown in FIG. 9, the final vibration waveform average value VIA is calculated in a form which does not include the noise vibration waveform due to injector noise, as shown in FIG. 9(*d*).

On the other hand, in cases where a change has been made to a state in which injector noise is superposed on the knock detection zone τk, as shown in FIG. 10, the noise vibration waveform resulting from injector noise is calculated in an appropriate manner, in the noise vibration waveform calculation zone τ2, as shown in FIG. 10(*b*).

This is because even if the generation position of the injector noise relatively changes with respect to the crank angle, the noise vibration waveform in the noise vibration waveform calculation zone τ2 is substantially the same. As a result, the final vibration waveform average value VIA is calculated in a form including injector noise, as shown in FIG. 10(*d*).

By using the vibration waveform average value VIA calculated in this way, even in cases where the position of the occurrence of noise vibration changes, the noise vibration waveform can be calculated and removed in an appropriate manner, so that it is possible to avoid erroneously detecting the noise vibration as a knock.

Returning to FIG. 6, an explanation will be made on the calculation process of the knock determination threshold value VTH in the case where there is a superposition of noise and a knock has occurred.

The detection signal of the knock sensor 11 in the case where a knock has occurred at the time of superposition of noise takes a vibration waveform including slap noise, injector noise, and vibration resulting from a knock, as shown in FIG. 6(*a*).

In the conventional apparatus, the background level vbgl and the knock determination threshold value vth are calculated based on the peak value vp of the vibration waveform due to the injector noise in FIG. 6(*a*) (or thin line in FIG. 6(*b*)), as shown in FIG. 6(*c*).

In this case, similar to the time when no knock has occurred (FIG. 5(*c*)), noise vibration is not erroneously detected as a knock, but the levels of the peak value vp and the knock determination threshold value vth become larger in comparison with the case where there is no superposition of noise (FIG. 3(*c*)), under the influence of injector noise.

Accordingly, in cases where a change is made from a state in which injector noise is not superposed on the knock detection zone τk into a state in which injector noise is superposed on the knock detection zone τk, there will be a possibility that the knock determination threshold value vth to be calculated by means of filtering processing may be late to follow the change, and hence, injector noise may be erroneously detected as a knock.

On the other hand, in the first embodiment of the present invention, the vibration waveform average value VIA with respect to the crank angle is calculated as a noise vibration waveform, as shown by thick line in FIG. 6(*b*).

At this time, the vibration waveforms of the slap noise and the injector noise are of the substantially identical shapes for every ignition cycle, so that when the individual vibration waveforms are shown in a superposed manner, as in FIG. 6(*b*), the changes of the vibration waveforms with respect to the crank angle at the generation positions of the slap noise and the injector noise are small.

In this case, too, the vibration waveform due to the knock or combustion noise is different for every ignition cycle, so when the vibration waveform is shown in a superposed manner, as shown in FIG. 4(*b*), the change of the vibration waveform with respect to the crank angle becomes large, at the generation position of the knock or combustion noise, Accordingly, the vibration waveform average value VIA is not affected to a large extent by the influence of the vibration waveform due to the knock or combustion noise in each ignition cycle, and hence, it is possible to calculate the noise vibration waveforms due to the slap noise, the injector noise and the regularly generated combustion noise, in an appropriate manner.

As a result of this, by subtracting the vibration waveform average value VIA (thick line in FIG. 6(*b*)) from the vibration waveform in FIG. 6(*a*) (or thin line in FIG. 6(*b*)), it is possible to remove the noise vibration waveform in an appropriate manner, as shown in FIG. 6(A) (or FIG. 6(B)).

Accordingly, in cases where noise vibration is superposed in the knock detection zone τk, as shown in FIG. 6(C), a knock can be detected with a high degree of accuracy.

Next, an explanation will be made on steps from the removal of the noise vibration waveform to the calculation of the knock determination threshold value in the case where the generation position of noise vibration (e.g., injector noise) changes to the vicinity of the position of the occurrence of a knock and is superposed in the knock detection zone τk, while referring to FIG. 7.

Figure 7:
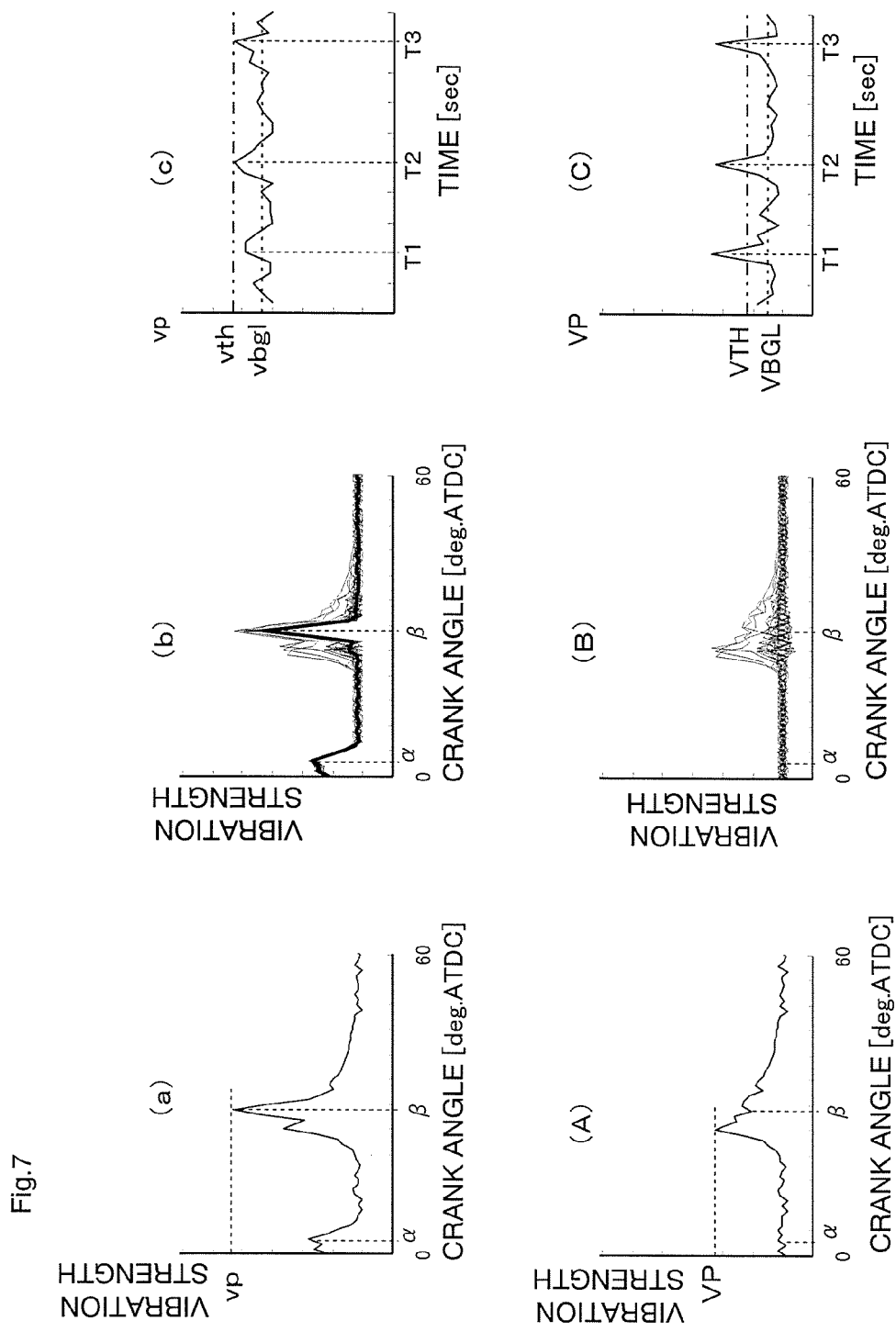
FIG. 7 includes (a) through (c) and (A) through (C) which are explanatory views showing processing steps from the removal of noise vibration waveforms to the calculation of a knock determination threshold value under the condition that a knock has occurred and there is a superposition of noise as well as a change in the position of noise, according to the first embodiment of the present invention.

FIG. 7 is an explanatory view showing processing steps under the condition that a knock has occurred, and there is a superposition of noise, and there is a change in the position of noise, wherein a case is shown in which the generation position (the crank angle β) of injector noise has changed from the state of FIG. 6 to the vicinity of the position of the occurrence of a knock (in the vicinity of 30 [deg. ATDC]).

(a) in FIG. 7 (hereinafter referred to as FIG. 7(*a*)) shows an example of a vibration waveform with respect to the crank angle in one ignition cycle detected by the vibration waveform detection unit 20.

(b) in FIG. 7 (hereinafter referred to as FIG. 7(*b*)) shows the vibration waveforms (thin lines) with respect to the crank angle in a plurality of ignition cycles in a superposed manner, and at the same time, shows the vibration waveform average value VIA (thick line) which is calculated by the vibration waveform average value calculation unit 21.

(c) in FIG. 7 (hereinafter referred to as FIG. 7(*c*)) corresponds to the thin lines in FIG. 7(*b*), and is a timing waveform which shows an example of the peak value vp (solid line) of the vibration waveform, the background level vbgl (dotted line), and the knock determination threshold value with (two-dot chain line), which are calculated by the conventional apparatus.

(A) in FIG. 7 (hereinafter referred to as FIG. 7(A)) shows the output waveform of the noise vibration waveform removal unit 22, wherein there is shown an example of the vibration waveform with respect to the crank angle in one ignition cycle after the vibration waveform average value VIA (the thick line in FIG. 7(*b*)) is removed from the vibration waveform of FIG. 7(*a*).

(B) in FIG. 7 (hereinafter referred to as FIG. 7(B)) show the vibration waveforms (thin lines) with respect to the crank angle in a plurality of ignition cycles after the removal of the noise vibration waveform in a superposed manner.

(C) in FIG. 7 (hereinafter referred to as FIG. 7(C)) corresponds to FIG. 7(B), and is a timing waveform which shows the peak value VP (solid line) of the vibration waveform, the background level VBGL (dotted line), and the knock determination threshold value VTH (two-dot chain line), which are calculated by the knock determination threshold value calculation unit 23.

As shown in FIG. 7(a), in cases where the generation position (the crank angle β) of injector noise has changed to the same timing as that of a knock vibration waveform (in the vicinity of 30 [deg. ATDC]), the vibration waveform detected by the vibration waveform detection unit 20 takes a shape in which the noise vibration waveform due to injector noise and the knock vibration waveform resulting from a knock are integrated or combined with each other.

In such a state, it is difficult to determine whether the detected vibration waveform and its peak position are resulting from injector noise, or resulting from a knock.

In this case, it is difficult to specify and remove the position of the occurrence of noise vibration by making a comparison between the detected vibration waveform and the stored noise vibration waveform, as in the above-mentioned first patent document.

In addition, because the detected vibration waveform takes such a shape in which the noise vibration waveform due to injector noise and the knock vibration waveform are integrated or combined with each other, it is affected by the influence of knock vibration at the generation position (the crank angle) of injector noise, as shown in FIG. 7(b). As a result, in the conventional apparatus, unless the position at which the peak value of the vibration waveform due to injector noise is generated and the position at which the peak value of the knock vibration waveform is generated completely match with each other, the peak value vp can not exceed the knock determination threshold value vth at time points T1, T2 and T3, as shown in FIG. 7(c), thus giving rise to a possibility that the occurrence of a knock may be unable to be detected with a high degree of accuracy.

Moreover, similarly as stated above, in the case of the conventional apparatus, the levels of the peak value vp and the knock determination threshold value vth become larger in comparison with the case where there is no superposition of noise (FIG. 3(c)), under the influence of injector noise, and hence, in cases where a change is made from a state in which injector noise is not superposed on the knock detection zone τk into a state in which injector noise is superposed on the knock detection zone τk, there will be a possibility that the knock determination threshold value vth to be calculated by means of filtering processing may be late to follow the change, and hence, injector noise may be erroneously detected as a knock.

On the other hand, according to the first embodiment of the present invention, the vibration waveform average value VIA (thick line in FIG. 7(b)) with respect to the crank angle for every plurality of ignition cycles is calculated, as a noise vibration waveform.

As mentioned above, even in cases where the vibration waveform due to injector noise, which is substantially the same for every ignition cycle, is superposed on the knock vibration waveform, it is possible to calculate the vibration waveform due to injector noise (refer to the thick line) in an appropriate manner, by calculating the vibration waveform average value VIA.

Accordingly, by subtracting the vibration waveform average value VIA (thick line in FIG. 7(b)) from the vibration waveform detected as shown in FIG. 7(a), it is possible to obtain a vibration waveform from which the noise vibration waveform has been removed in an appropriate manner, as shown in FIG. 7(A).

As a result of this, even in cases where the vibration waveform due to injector noise and the knock vibration waveform are generated at the same timing, a knock can be detected with a high degree of accuracy, as shown in FIG. 7(C).

Next, an explanation will be made on steps from the removal of the noise vibration waveform to the calculation of the knock determination threshold value in the case where the shapes of the noise vibration waveforms (i.e., slap noise and injector noise) change to be superposed with each other in the knock detection zone τk, while referring to FIG. 8.

Figure 8:
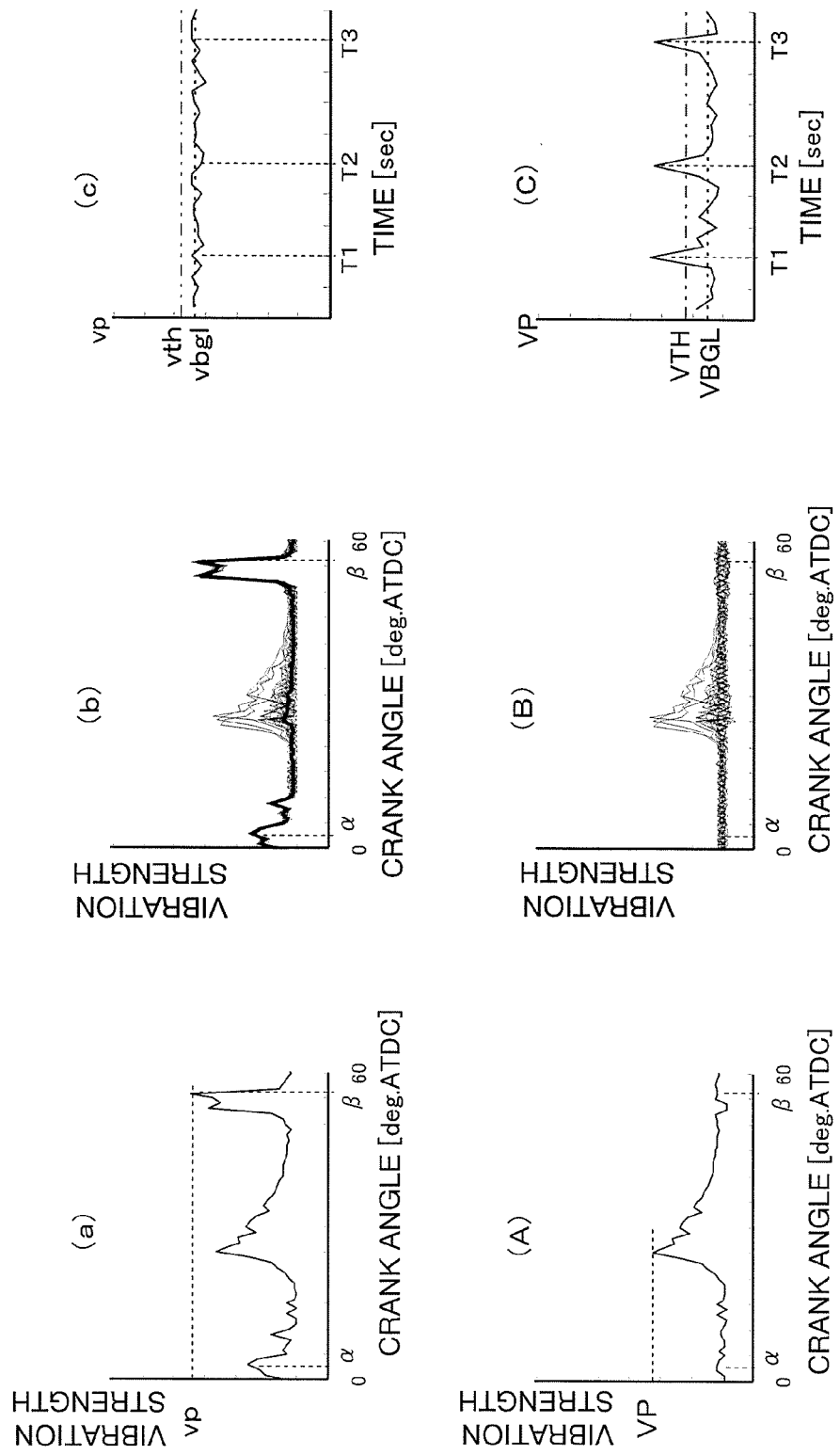
FIG. 8 includes (a) through (c) and (A) through (C) which are explanatory views showing processing steps from the removal of noise vibration waveforms to the calculation of a knock determination threshold value under the condition that a knock has occurred and there is a superposition of noise as well as a change in the shape of noise, according to the first embodiment of the present invention.

FIG. 8 is an explanatory view showing processing steps under the condition that a knock has occurred, and there is a superposition of noise, and there is a change in the shape of noise, according to the first embodiment of the present invention, wherein a case is shown in which the shapes of the vibration waveforms of slap noise and injector noise have changed with respect to the state of FIG. 6.

(a) in FIG. 8 (hereinafter referred to as FIG. 8(a)) shows an example of a vibration waveform with respect to the crank angle in one ignition cycle detected by the vibration waveform detection unit 20.

(b) in FIG. 8 (hereinafter referred to as FIG. 8(b)) shows the vibration waveforms (thin lines) with respect to the crank angle in a plurality of ignition cycles in a superposed manner, and at the same time, shows the vibration waveform average value VIA (thick line) which is calculated by the vibration waveform average value calculation unit 21.

(c) in FIG. 8 (hereinafter referred to as FIG. 8(c)) corresponds to the thin lines in FIG. 8(b), and is a timing waveform which shows an example of the peak value vp (solid line) of the vibration waveform, the background level vbgl (dotted line), and the knock determination threshold value vth (two-dot chain line), which are calculated by the conventional apparatus.

(A) in FIG. 8 (hereinafter referred to as FIG. (A)) shows the output waveform of the noise vibration waveform removal unit 22, wherein there is shown an example of the vibration waveform with respect to the crank angle in one ignition cycle after the vibration waveform average value VIA (the thick line in FIG. 8(b)) is removed from the vibration waveform of FIG. 8(a).

(B) in FIG. 8 (hereinafter referred to as FIG. 8(B)) show the vibration waveforms (thin lines) with respect to the crank angle in a plurality of ignition cycles after the removal of the noise vibration waveform in a superposed manner.

(C) in FIG. 8 (hereinafter referred to as FIG. 8(C)) corresponds to FIG. 8(B), and is a timing waveform which shows the peak value VP (solid line) of the vibration waveform, the background level VBGL (dotted line), and the knock determination threshold value VTH (two-dot chain line), which are calculated by the knock determination threshold value calculation unit 23.

In general, as shown in FIG. 8(a), the noise vibration waveforms resulting from slap noise (at the crank angle α) and injector noise (at the crank angle β) may change according to the individual difference of the engine 1 or component parts, the installation distances between the knock sensor 11 and the component parts, or the operating state of the internal combustion engine, in comparison with the typical vibration waveform (refer to FIG. 6(a)).

In this manner, the noise vibration waveforms change in a variety of kinds of ways, and hence, it is practically difficult to adapt the noise vibration waveforms in advance through experiments, etc., as described in the above-mentioned first patent document, and even if such adaptation can be made, a lot of adaptation man hours are required, and besides, actually generated noise vibration waveforms can not be removed in a suitable manner, resulting in a possibility that knock detectability may get worse.

In addition, it is difficult to specify the generation position of noise vibration, such as slap noise, inherent in the individual engine 1, unlike noise vibration, such as injector noise, resulting from the operation of a component part.

On the other hand, according to the first embodiment of the present invention, the vibration waveform average value VIA (thick line in FIG. 8(b)) with respect to the crank angle for every plurality of ignition cycles is calculated, as a noise vibration waveform.

As mentioned above, the vibration waveforms due to slap noise and injector noise are substantially the same for every ignition cycle, and hence, when the individual vibration waveforms are shown in a superposed manner, as shown in FIG. 8(b), the changes of the vibration waveforms with respect to the crank angle at the generation positions of the slap noise and the injector noise are small, so that they are reflected on the vibration waveform average value VIA (thick line in FIG. 8(b)) to a large extent.

On the other hand, the vibration waveform due to the knock or combustion noise is different for every ignition cycle, so that when the vibration waveform is shown in a superposed manner, as shown in FIG. 8(b), the change of the vibration waveform with respect to the crank angle is large, at the generation position of the knock or combustion noise, and the vibration waveform average value VIA is not affected to a large extent by the influence of the vibration waveform due to the knock or combustion noise for every ignition cycle.

Accordingly, the noise vibration waveforms due to the slap noise, the injector noise, and the regularly generated combustion noise can be calculated in an appropriate manner.

As a result of this, by subtracting the vibration waveform average value VIA (thick line in FIG. 8(b)) from the vibration waveform in FIG. 8(a) (or thin line in FIG. 8(b)), it is possible to obtain a vibration waveform from which the noise vibration waveform has been removed in an appropriate manner, as shown in FIG. 8(A) (or FIG. 8(B)).

As a result of this, even in cases where the shape of the noise vibration waveform changes, a knock can be detected with a high degree of accuracy, as shown in FIG. 8(C).

Now, reference will be made to the operation of a knock control function according to the first embodiment of the present invention, while referring to a flow chart of FIG. 11.

Figure 11:
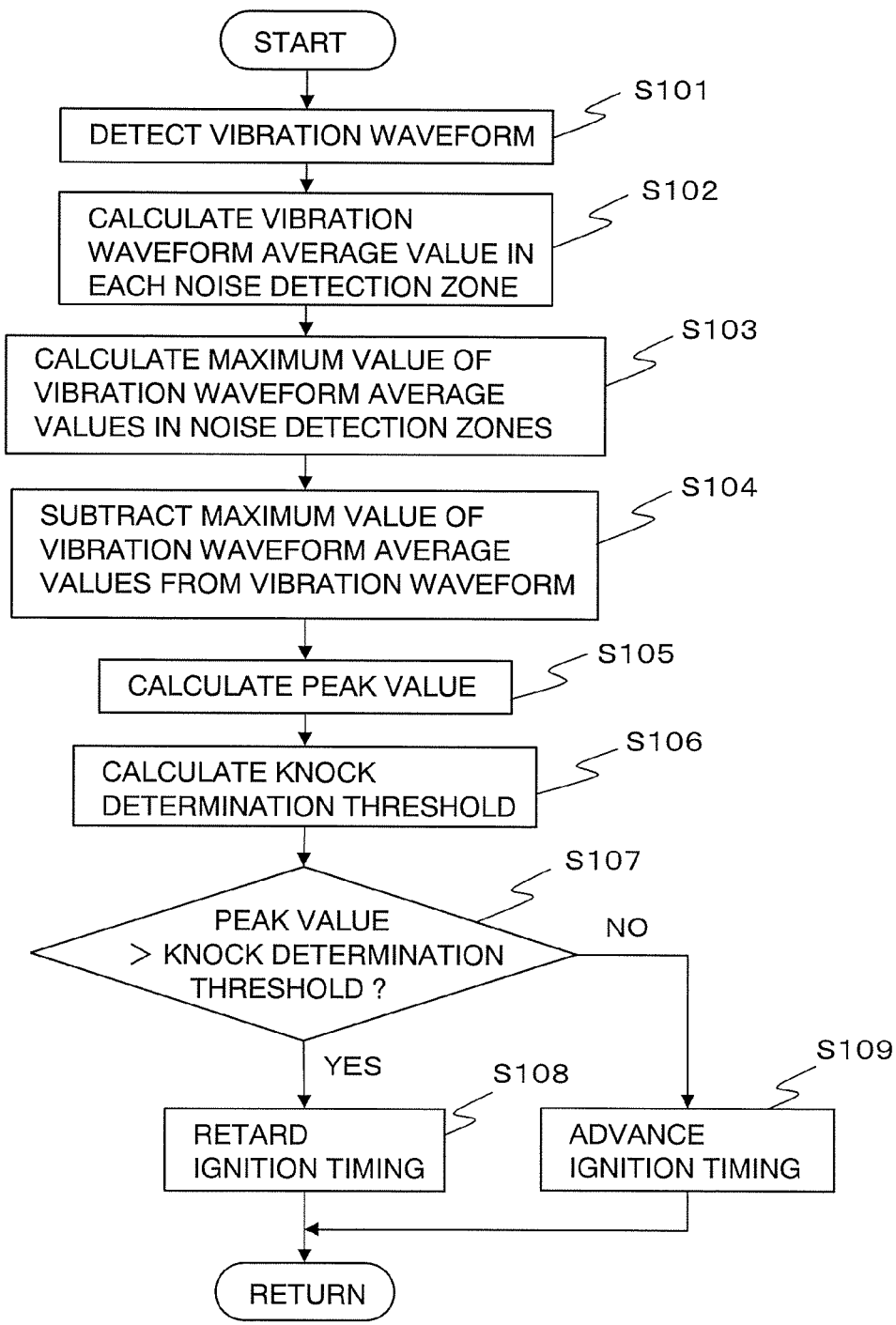
FIG. 11 is a flow chart showing a knock control operation according to the first embodiment of the present invention.

In FIG. 11, first of all, the vibration waveform detection unit 20 in the microcomputer 62 detects the strength of vibration with respect to the crank angle as a vibration waveform, based on the detection signals from the knock sensor 11 and the crank angle sensor 9 (step S101).

At this time, the detection of the vibration waveform is carried out in the knock detection zone τk (e.g., TDC–60 [deg. ATDC]) and in each noise vibration waveform calculation zone.

Here, note that as such a noise vibration waveform calculation zone, there is applied either of the following ones, including a crank angle zone (e.g., –10 [deg. ATDC]–70 [deg. ATDC]) which is experimentally obtained in advance on the basis of the crank angle, a crank angle zone (e.g., a zone from the fuel injection timing of the injector 3 to 10 [deg. C.A] (C.A: Crank Angle)) which is experimentally obtained in advance on the basis of an operation position of each component part of the engine 1, and a crank angle zone (e.g., a zone from the ignition timing of the injector 3 to 30 [deg. C.A]) which is experimentally obtained in advance on the basis of a combustion position.

Subsequently, the vibration waveform average value calculation unit 21 calculates vibration waveform average values by carrying out filtering processing with respect to the vibration waveform in each noise vibration waveform calculation zone detected in step S101 at every prescribed crank angle (e.g., 1 [deg. C.A]) over a plurality of ignition cycles (step S102). In addition, the vibration waveform average value calculation unit 21 calculates a maximum value of the plurality of vibration waveform average values calculated in step S102 in the knock detection zone τk, as a final vibration waveform average value VIA (step S103).

Then, the noise vibration waveform removal unit 22 subtracts the vibration waveform average value VIA (the maximum value of the vibration waveform average values) calculated in step S103 from the vibration waveform (the vibration strength VI) detected in step S101, in the knock detection zone τk (step S104).

In addition, the noise vibration waveform removal unit 22 calculates a peak value VP of the vibration waveform after the subtraction of the vibration waveform average value VIA (the maximum value) in step S104 (step S105).

Subsequently, the knock determination threshold value calculation unit 23 calculates a knock determination threshold value VTH based on the peak value VP (step S106).

Thereafter, the knock determination unit 24 determines whether a knock has actually occurred, according to whether or not the peak value VP is larger than the knock determination threshold value VTH (step S107).

Finally, in cases where the result of the determination in step S107 is "VP>VTH (i.e., YES)", the knock correction amount calculation unit 25 assumes that a knock has occurred, and calculates a knock correction amount θR for carrying out retard correction of the driving timing (ignition timing) of the ignition coil 13 and the spark plug 2 (step S108), after which the processing routine of FIG. 11 is ended, and a return is made.

On the other hand, in cases where the result of the determination in step S107 is "VP≤VTH (i.e., NO)", the knock correction amount calculation unit 25 assumes that no knock has occurred, returns the ignition timing to an advance position (step S109), and makes a return to the initial step after ending the processing routine of FIG. 11.

As described above, the knock control apparatus for an internal combustion engine according to the first embodiment of the present invention is provided with: the knock sensor 11 that detects a vibration of the engine 1 (the internal combustion engine); the crank angle sensor 9 that detects a crank angle of the engine 1; the vibration waveform detection unit 20 that detects a vibration waveform of a knock natural frequency component from a detection signal of the knock sensor 11 by making it into association with the crank angle; the vibration waveform average value calculation unit 21 that calculates a vibration waveform average value VIA corresponding to a noise vibration waveform generated in a regular manner by carrying out filtering processing of the vibration waveform over a plurality of ignition cycles of the engine 1; the noise vibration waveform removal unit 22 that removes the noise vibration waveform by subtracting the vibration waveform average value VIA from the vibration waveform; the knock determination threshold value calculation unit 23 that calculates a knock determination threshold value VTH based on the peak value VP of the vibration waveform after the noise vibration waveform has been removed; and the knock determination unit 24 that determines whether a knock has occurred in the engine 1, by making a comparison between the peak value VP and the knock determination threshold value VTH.

In cases where the peak value VP is larger than the knock determination threshold value VTH, the knock determination unit 24 makes a determination that a knock has occurred in the engine 1.

In this manner, by calculating the vibration waveform average value VIA by carrying out filtering processing of the vibration waveform detected in each ignition cycle at every predetermined crank angle over the plurality of ignition cycles, it is possible to calculate the noise vibration waveform which changes in a variety of kinds of ways, with a high degree of accuracy, without particularly carrying out a detailed or close adaptation.

In addition, by subtracting the calculated vibration waveform average value VIA from the detected vibration waveform, it is possible to remove the noise vibration waveform in an appropriate manner and with a high degree of accuracy, without adapting the generation position and shape of the noise vibration waveform.

Moreover, by making a comparison between the peak value VP of the vibration waveform after removal of noise and the knock determination threshold value VTH calculated based on the peak value VP, it is possible to detect, with a high degree of accuracy, whether a knock has occurred in the engine 1.

Accordingly, it becomes possible to appropriately calculate and remove a variety of kinds of noise vibration waveforms generated regularly by causes other than knock, resulting from the operation of the engine 1, without adapting the generation positions and shapes of the noise vibration waveforms, and hence, it is possible to achieve a knock control apparatus for an internal combustion engine which has been improved in knock detectability to a sufficient extent.

That is, adaptation man hours can be reduced, so that the S/N ratio of knock detection and improvements in robust can be achieved.

In addition, the vibration waveform average value calculation unit 21 calculates individual vibration waveform average values VIA on the basis of at least one of the combustion position of the engine 1, the operation position of a component part, and the crank angle, respectively, wherein the combustion position includes the ignition timing of the engine 1, and the operation position of the component part includes the fuel injection timing of the injector 3, or the opening and closing timing of the intake valve 1c or the exhaust valve 1d.

As a result of this, even in cases where the generation position of the noise vibration waveform changes, it becomes possible to calculate the noise vibration waveform in an appropriate manner.

Moreover, the vibration waveform average value calculation unit 21 sets the maximum value of the plurality of vibration waveform average values thus calculated to a final vibration waveform average value VIA.

As a result of this, even in cases where a plurality of noise vibration waveforms are superposed at the same timing, it becomes possible to calculate the noise vibration waveform in an appropriate manner.

What is claimed is:

1. A knock control apparatus for an internal combustion engine comprising:
 a knock sensor that detects a vibration of the internal combustion engine;
 a crank angle sensor that detects a crank angle of said internal combustion engine;
 a vibration waveform detection unit that detects a vibration waveform of a knock natural frequency component from a detection signal of said knock sensor by making it into association with said crank angle;
 a vibration waveform average value calculation unit that calculates a vibration waveform average value corresponding to a noise vibration waveform generated in a regular manner by carrying out filtering processing of said vibration waveform over a plurality of ignition cycles of said internal combustion engine;
 a noise vibration waveform removal unit that removes said noise vibration waveform by subtracting said vibration waveform average value from said vibration waveform;
 a knock determination threshold value calculation unit that calculates a knock determination threshold value based on a peak value of the vibration waveform after said noise vibration waveform has been removed; and
 a knock determination unit that determines whether a knock has occurred in said internal combustion engine, by making a comparison between said peak value and said knock determination threshold value.

2. The knock control apparatus for an internal combustion engine as set forth in claim 1, wherein
 said vibration waveform average value calculation unit calculates individual vibration waveform average values on the basis of at least one of a combustion position of said internal combustion engine, an operation position of a component part, and said crank angle, respectively.

3. The knock control apparatus for an internal combustion engine as set forth in claim 2, wherein
 said combustion position includes ignition timing of said internal combustion engine; and
 the operation position of said component part includes fuel injection timing of an injector of said internal combustion engine, or opening and closing timing of an intake valve or an exhaust valve.

4. The knock control apparatus for an internal combustion engine as set forth in claim 1, wherein
 said vibration waveform average value calculation unit sets a maximum value of the plurality of vibration waveform average values thus calculated to a final vibration waveform average value.

5. The knock control apparatus for an internal combustion engine as set forth in claim 1, wherein in cases where said peak value is larger than said knock determination threshold value, said knock determination unit makes a determination that a knock has occurred in said internal combustion engine.

6. The knock control apparatus for an internal combustion engine as set forth in claim 1, wherein the noise vibration waveform removal unit is configured to generate the peak value of the vibration waveform after subtracting the vibration waveform average value from the vibration waveform.

7. The knock control apparatus for an internal combustion engine as set forth in claim 6, wherein the knock determination threshold value calculation unit is configured to calculate the knock determination threshold value as a sum of an average value and a value proportional to a standard deviation, of the peak value calculated based on the vibration waveform from which the noise vibration waveform has been removed.

* * * * *